US012462820B2

(12) United States Patent
Gao et al.

(10) Patent No.: US 12,462,820 B2
(45) Date of Patent: Nov. 4, 2025

(54) HOWLING SUPPRESSION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Yi Gao, Shenzhen (CN); Cheng Luo, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 292 days.

(21) Appl. No.: 17/977,380

(22) Filed: Oct. 31, 2022

(65) Prior Publication Data
US 2023/0046518 A1    Feb. 16, 2023

Related U.S. Application Data

(63) Continuation of application No. PCT/CN2021/112769, filed on Aug. 16, 2021.

(30) Foreign Application Priority Data

Sep. 30, 2020 (CN) .................. 202011062254.8

(51) Int. Cl.
*G10L 19/018* (2013.01)
*G10L 25/18* (2013.01)
(Continued)

(52) U.S. Cl.
CPC ............ *G10L 19/018* (2013.01); *G10L 25/18* (2013.01); *G10L 25/21* (2013.01); *G10L 25/51* (2013.01); *G10L 25/84* (2013.01); *G10L 25/90* (2013.01)

(58) Field of Classification Search
CPC ....... G10L 19/018; G10L 25/18; G10L 25/21; G10L 25/51; G10L 25/84; G10L 25/90; G10L 21/0208; G10L 2021/02082
See application file for complete search history.

(56) References Cited

U.S. PATENT DOCUMENTS 5,940,499 A * 8/1999 Fujii ....................... H04M 9/08
                                                    379/388.05
6,161,091 A * 12/2000 Akamine ............ G10L 19/0018
                                                    704/256.1
(Continued)

FOREIGN PATENT DOCUMENTS

CN        1684143 A       10/2005
CN      109461455 A        3/2019
(Continued)

OTHER PUBLICATIONS

The European Patent Office (EPO) The Extended European Search Report for 21874102.3 Sep. 8, 2023 7 Pages.
(Continued)

*Primary Examiner* — Bhavesh M Mehta
*Assistant Examiner* — Paul J. Mueller
(74) *Attorney, Agent, or Firm* — Anova Law Group, PLLC

(57) ABSTRACT

This application relates to a howling suppression method and apparatus, a computer device, and a storage medium. The method includes obtaining a current audio signal corresponding to a current time period, and performing frequency domain transformation on the current audio signal; dividing the frequency domain audio signal and determining a target subband; obtaining a current howling detection result and a current voice detection result that correspond to the current audio signal, and determining a subband gain coefficient; obtaining a past subband gain corresponding to an audio signal within a past time period, and calculating a
(Continued)

current subband gain corresponding to the current audio signal based on the subband gain coefficient and the past subband gain; and suppressing howling on the target subband based on the current subband gain, to obtain a first target audio signal corresponding to the current time period.

19 Claims, 10 Drawing Sheets

(51) Int. Cl.
  G10L 25/21 (2013.01)
  G10L 25/51 (2013.01)
  G10L 25/84 (2013.01)
  G10L 25/90 (2013.01)

(56) References Cited

U.S. PATENT DOCUMENTS

| | | | | |
|---|---|---|---|---|
| 9,263,044 | B1* | 2/2016 | Cassidy | G10L 21/0208 |
| 11,250,833 | B1* | 2/2022 | Bajic | G10K 11/17875 |
| 2005/0246179 | A1* | 11/2005 | Kraemer | H04S 3/00 |
| | | | | 704/500 |
| 2006/0227978 | A1* | 10/2006 | Truong | H04M 9/082 |
| | | | | 381/66 |
| 2015/0104039 | A1* | 4/2015 | Lee | G10L 21/0208 |
| | | | | 381/93 |
| 2015/0270970 | A1* | 9/2015 | Wu | H04N 21/42684 |
| | | | | 700/94 |
| 2015/0372723 | A1* | 12/2015 | Gao | G10L 21/0232 |
| | | | | 704/205 |
| 2018/0211681 | A1* | 7/2018 | Miyabe | H04R 3/04 |
| 2020/0120429 | A1* | 4/2020 | Hong | H04M 1/20 |
| 2022/0246162 | A1 | 8/2022 | Liang | |

FOREIGN PATENT DOCUMENTS

| | | |
|---|---|---|
| CN | 109637552 A | 4/2019 |
| CN | 110012408 A | 7/2019 |
| CN | 110035374 A | 7/2019 |
| CN | 110148426 A | 8/2019 |
| CN | 110213694 A | 9/2019 |
| CN | 111048119 A | 4/2020 |
| CN | 111210021 A | 5/2020 |
| CN | 111556410 A | 8/2020 |
| CN | 111724808 A | 9/2020 |
| EP | 1978649 A2 | 10/2008 |
| WO | 2021194859 A1 | 9/2021 |

OTHER PUBLICATIONS

The World Intellectual Property Organization (WIPO) International Search Report for PCT/CN2021/112769 Nov. 5, 2021 7 Pages (including translation).
China National Intellectual Property Administration (CNIPA) Office Action 1 for Application No. 202011062254.8 Mar. 12, 2025 13 Pages (including translation).

* cited by examiner

HOWLING SUPPRESSION METHOD AND APPARATUS, COMPUTER DEVICE, AND STORAGE MEDIUM

RELATED APPLICATIONS

This application is a continuation application of PCT Application No. PCT/CN2021/112769, filed on Aug. 16, 2021, which in turn claims priority to Chinese Patent Application No. 2020110622548, entitled "HOWLING SUPPRESSION METHOD AND APPARATUS, COMPUTER DEVICE, AND STORAGE MEDIUM" filed with the China National Intellectual Property Administration on Sep. 30, 2020. The two applications are incorporated herein by reference in their entirety.

FIELD OF THE TECHNOLOGY

This application relates to the field of computer technologies, and in particular, to a howling suppression method and apparatus, a computer device, and a storage medium.

BACKGROUND OF THE DISCLOSURE

With the development of Internet communication technologies, voice calls can be performed based on a network, for example, voice calls can be made from various instant messaging applications. However, during a voice call especially a voice conference, two or more voice call devices are often relatively close to each other, such as in a same room. In this case, howling is easy to occur, affecting quality of the voice call. Currently, a distance between the voice call devices is usually adjusted to avoid howling. However, when the distance cannot be adjusted, howling is generated, resulting in reduction of the quality of the voice call.

SUMMARY

Embodiments of this application provide a howling suppression method and apparatus, a computer device, and a storage medium.

One aspect of the present disclosure provides a howling suppression method. The method includes obtaining a current audio signal corresponding to a current time period, and performing frequency domain transformation on the current audio signal, to obtain a frequency domain audio signal; dividing the frequency domain audio signal, to obtain subbands, and determining a target subband from the subbands; obtaining a current howling detection result and a current voice detection result that correspond to the current audio signal, and determining a subband gain coefficient corresponding to the current audio signal based on the current howling detection result and the current voice detection result; obtaining a past subband gain corresponding to an audio signal within a past time period, and calculating a current subband gain corresponding to the current audio signal based on the subband gain coefficient and the past subband gain; and suppressing howling on the target subband based on the current subband gain, to obtain a first target audio signal corresponding to the current time period.

A computer device is provided, including a memory and a processor, the memory storing computer-readable instructions, and the computer-readable instructions, when executed by the processor, causing the processor to perform a howling suppression method. The method includes obtaining a current audio signal corresponding to a current time period, and performing frequency domain transformation on the current audio signal, to obtain a frequency domain audio signal; dividing the frequency domain audio signal, to obtain subbands, and determining a target subband from the subbands; obtaining a current howling detection result and a current voice detection result that correspond to the current audio signal, and determining a subband gain coefficient corresponding to the current audio signal based on the current howling detection result and the current voice detection result; obtaining a past subband gain corresponding to an audio signal within a past time period, and calculating a current subband gain corresponding to the current audio signal based on the subband gain coefficient and the past subband gain; and suppressing howling on the target subband based on the current subband gain, to obtain a first target audio signal corresponding to the current time period.

One or more non-transitory storage media storing computer-readable instructions are provided, the computer-readable instructions, when being executed by one or more processors, causing the one or more processors to perform howling suppression method. The method includes obtaining a current audio signal corresponding to a current time period, and performing frequency domain transformation on the current audio signal, to obtain a frequency domain audio signal; dividing the frequency domain audio signal, to obtain subbands, and determining a target subband from the subbands; obtaining a current howling detection result and a current voice detection result that correspond to the current audio signal, and determining a subband gain coefficient corresponding to the current audio signal based on the current howling detection result and the current voice detection result; obtaining a past subband gain corresponding to an audio signal within a past time period, and calculating a current subband gain corresponding to the current audio signal based on the subband gain coefficient and the past subband gain; and suppressing howling on the target subband based on the current subband gain, to obtain a first target audio signal corresponding to the current time period.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions in the embodiments of this application more clearly, the following briefly describes accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

To make the objectives, technical solutions, and advantages of this application clearer, the following further describes this application in detail with reference to the accompanying drawings and the embodiments. It is to be understood that the embodiments described herein are only used for explaining this application, and are not used for limiting this application.

Figure 1:
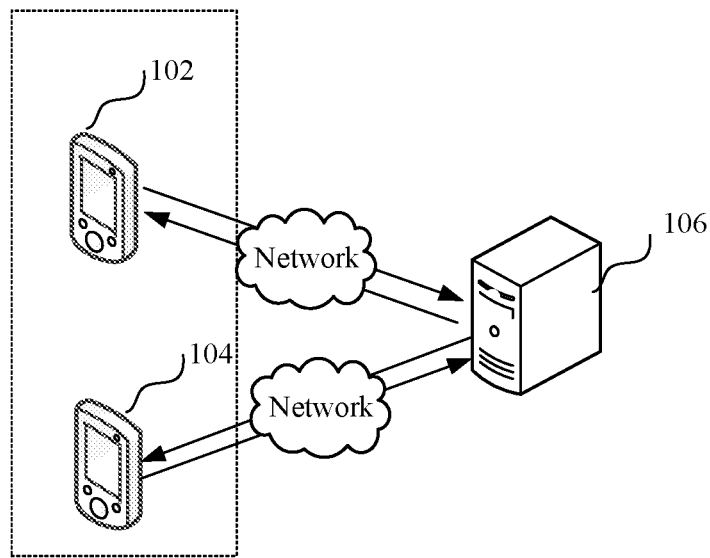
FIG. 1 is a diagram of an application environment of a howling suppression method according to an embodiment.

A howling suppression method provided in the embodiments of this application is applicable to an application environment shown in FIG. 1. A howling suppression method often applies algorithms to monitor incoming signals for signs of feedback; when it detects feedback, it places a filter at each frequency that feeds back, reducing the gain of that frequency. A terminal 102 communicates with a server 106 through a network. A terminal 104 communicates with the server 106 through a network. The terminal 102 performs a voice call with the terminal 104 by using the server 106, and the terminal 102 is relatively close to the terminal 104, for example, in a same room. The terminal 102 and the terminal 104 may be transmitting terminals for transmitting a voice or may be receiving terminals for receiving a voice. The terminal 102 or the terminal 104 obtains a current audio signal corresponding to a current time period, and performs frequency domain transformation on the current audio signal, to obtain a frequency domain audio signal. The terminal 102 or the terminal 104 divides the frequency domain audio signal, to obtain subbands, and determines a target subband from the subbands. The terminal 102 or the terminal 104 obtains a current howling detection result and a current voice detection result that correspond to the current audio signal, and determines a subband gain coefficient corresponding to the current audio signal based on the current howling detection result and the current voice detection result. The terminal 102 or the terminal 104 obtains a past subband gain corresponding to an audio signal within a past time period, and calculates a current subband gain corresponding to the current audio signal based on the subband gain coefficient and the past subband gain. The terminal 102 or the terminal 104 performs howling suppression on the target subband based on the current subband gain, to obtain a first target audio signal corresponding to the current time period. The terminal may be, but not limited to, a personal computer, a notebook computer, a smartphone, a tablet computer, and a portable wearable device. The server may be implemented by an independent server or a server cluster comprising a plurality of servers.

Figure 2:
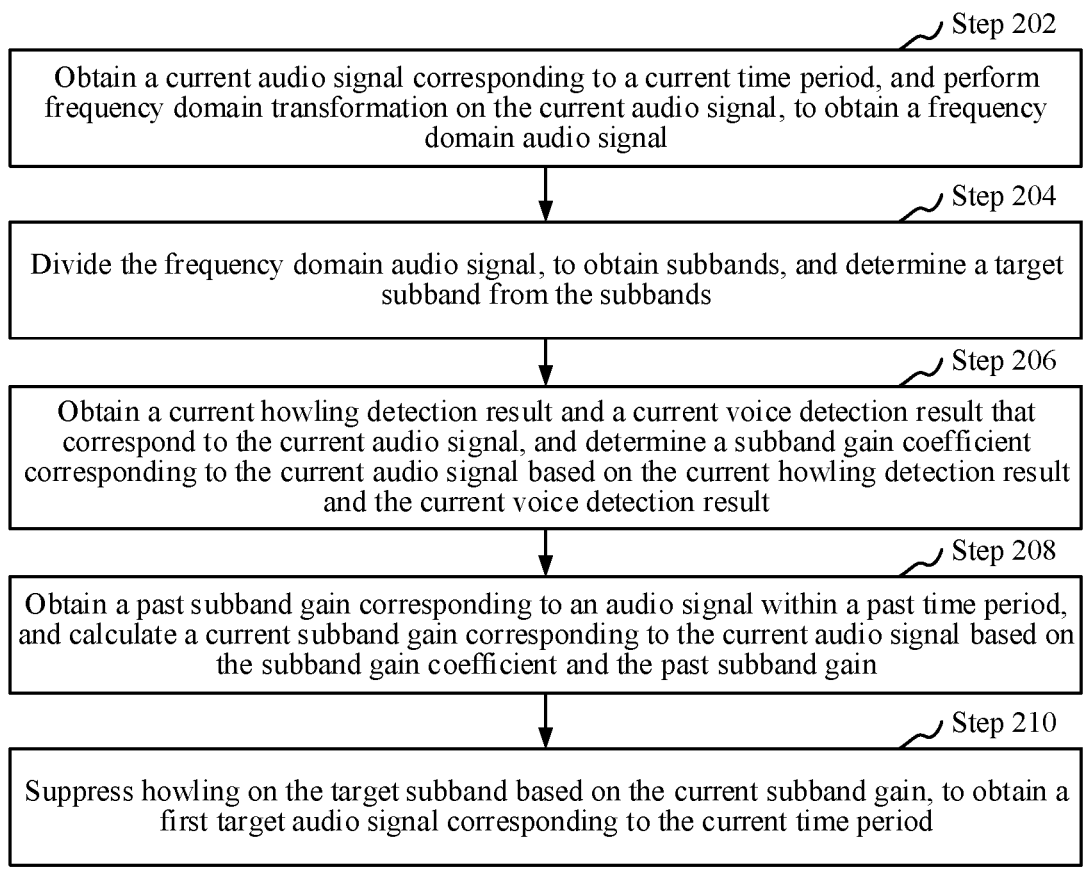
FIG. 2 is a schematic flowchart of a howling suppression method according to an embodiment.

In an embodiment, as shown in FIG. 2, a howling suppression method is provided, and a description is made by using an example in which the method is applicable to the terminal shown in FIG. 1. It may be understood that the method is also applicable to the server or applicable to a system including the terminal and the server and is implemented through interaction between the terminal and the server. In this embodiment, the method includes the following steps.

Step 202. Obtain a current audio signal corresponding to a current time period, and perform frequency domain transformation on the current audio signal, to obtain a frequency domain audio signal.

An audio signal is an information carrier carrying frequency and amplitude change of a sound wave of voice, music, sound effect, or the like. The current audio signal is an audio signal on which howling suppression needs to be performed, that is, the current audio signal has a howling signal. Self-excitation of energy between an acoustic source and an amplification device occurs due to an excessively small distance or other problems, to generate howling. The howling signal is an audio signal corresponding to howling, and howling is often sharp and raspy. The current audio signal may be an audio signal on which howling suppression needs to be performed and that is obtained after an audio signal is acquired by using an acquisition device such as a microphone and then signal processing is performed on the audio signal. The signal processing may include echo cancellation, noise suppression, howling detection, and the like. The echo cancellation indicates eliminating, noise generated due to a feedback path generated between an acquisition device such as a microphone and a playback device such as a speaker due to air. The noise suppression indicates extracting pure original audio and an audio signal without background noise from audio with noise. The howling detection indicates detecting whether an audio signal has a howling signal. The current audio signal may alternatively be an audio signal on which howling suppression needs to be performed and that is obtained after an audio signal is received through a network and is processed. The signal processing may be howling detection. The current time period is a time period of the current audio signal, that is, a time period after voice framing is performed on an audio signal, for example, a length of the current time period may be within 10 ms to 30 ms. The frequency domain transformation indicates transforming the current audio signal from a time domain to a frequency domain. The time domain is used for describing a relationship between an audio signal and a time, and a time-domain waveform of the audio signal may indicate that the audio signal changes over time. The frequency domain is a coordinate system used for describing a frequency feature of a signal and indicates that the audio signal changes with a frequency. A frequency domain diagram shows a semaphore in each given frequency band within a frequency range. A frequency domain representation may also include information about phase shift of each sinusoid curve so that frequency components can be recombined to restore an original time signal. The frequency domain audio signal is an audio signal obtained by transforming the current audio signal from the time domain to the frequency domain.

In some embodiments, the terminal may preform voice acquisition by using an acquisition device such as a microphone, to obtain an audio signal within a current time period, and then perform howling detection on the audio signal. Howling may be detected by using a machine learning model established by using a neural network or howling may be detected by using parameter criteria such as a peak/average ratio. Alternatively, howling may be detected based on a pitch period in the audio signal. Alternatively, howling may be detected based on energy in the audio signal.

When an audio signal has a howling signal, the current audio signal corresponding to the current time period is obtained. Subsequently, frequency domain transformation is performed on the current audio signal through Fourier transform, to obtain a frequency domain audio signal. Before performing howling detection on the acquired audio signal, the terminal may further perform processing such as echo cancellation and noise suppression on the acquired audio signal.

The terminal may alternatively obtain a voice sent by another voice call terminal through a network, to obtain an audio signal within a current time period, and then perform howling detection on the audio signal, obtain a current audio signal corresponding to the current time period when the audio signal has a howling signal, and then perform frequency domain transformation on the current audio signal through Fourier transform, to obtain a frequency domain audio signal. In an embodiment, the terminal may alternatively obtain an audio signal delivered by the server, then perform howling detection on the audio signal, and obtain a current audio signal corresponding to a current time period when the audio signal has a howling signal.

Step 204. Divide the frequency domain audio signal, to obtain subbands, and determine a target subband from the subbands.

The subband refers to audio signal in a subband obtained by dividing the frequency domain audio signal. The target subband is a subband on which howling suppression needs to be performed.

In some embodiments, the terminal may divide the frequency domain audio signal by using a band-pass filter, to obtain subbands. The subbands may be obtained through division according to a preset quantity of subbands or according to a preset frequency band range. Subsequently, energy of the subbands is calculated, and a target subband is selected according to the energy of the subbands. There may be one selected target subband, for example, a subband with maximum energy is the target subband, or may be a plurality of target subbands, for example, the selected target subbands may be a preset quantity of subbands selected in descending order of the energy of the subbands.

Step 206. Obtain a current howling detection result and a current voice detection result that correspond to the current audio signal, and determine a subband gain coefficient corresponding to the current audio signal based on the current howling detection result and the current voice detection result.

The current howling detection result is a detection result obtained by performing howling detection on the current audio signal and may include that the current audio signal has a howling signal, and the current audio signal has no howling signal. The current voice detection result is a detection result obtained by performing voice activity detection on the current audio signal. The voice activity detection (VAD) indicates accurately positioning starting and ending of a voice in the current audio signal. The current voice detection result may include that the current audio signal has a voice signal, and the current audio signal has no voice signal. The subband gain coefficient is used for representing a degree at which howling suppression needs to be performed on the current audio signal. A smaller subband gain coefficient indicates a higher degree at which howling suppression needs to be performed on the current audio signal. A larger subband gain coefficient indicates a lower degree at which howling suppression needs to be performed on the current audio signal.

In some embodiments, the terminal may obtain a current howling detection result and a current voice detection result that correspond to the current audio signal. The current howling detection result and the current voice detection result that correspond to the current audio signal may be obtained by performing howling detection and voice activity detection on the current audio signal before howling suppression and stored in an internal memory.

The terminal may alternatively obtain a current howling detection result and a current voice detection result that correspond to the current audio signal from a third party, the third party being a service party that performs howling detection and voice activity detection on the current audio signal. For example, the terminal may obtain the stored current howling detection result and current voice detection result that correspond to the current audio signal from the server.

Step 208. Obtain a past subband gain corresponding to an audio signal within a past time period, and calculate a current subband gain corresponding to the current audio signal based on the subband gain coefficient and the past subband gain.

The past time period is a past time period corresponding to the current time period. A time length of the past time period may be the same as a time length of the current time period or may be different from a time length of the current time period. The past time period may be one time period before the current time period or may be a plurality of time periods before the current time period. The past time period may have a preset interval with the current time period or may be directly connected to the current time period. For example, within a time of from 0 ms to 100 ms, the current time period may be from 80 ms to 100 ms, and the past time period may be a time period from 60 ms to 80 ms. The audio signal within the past time period is an audio signal on which howling suppression has been performed. The past subband gain is a subband gain used when howling suppression is performed on the audio signal within the past time period. The current subband gain is a subband gain used when howling suppression is performed on the current audio signal.

In some embodiments, the terminal may obtain a past subband gain corresponding to an audio signal within a past time period from the internal memory, and calculate a product of the subband gain coefficient and the past subband gain, to obtain a current subband gain corresponding to the current audio signal. If the current time period is a starting time period, the past subband gain is a preset initial subband gain value, for example, the initial subband gain value may be 1. When the initial subband gain value is 1, it indicates that the current audio signal is not suppressed. When the subband gain coefficient is less than 1, it indicates that howling suppression needs to be performed on the current audio signal, and when the subband gain coefficient is greater than 1, it indicates that howling suppression on the current audio signal needs to be reduced.

In an embodiment, the current subband gain corresponding to the current audio signal is compared with a lower limit value of a preset subband gain. When the current subband gain corresponding to the current audio signal is less than the lower limit value of the preset subband gain, the lower limit value of the preset subband gain is used as the current subband gain of the current audio signal.

In an embodiment, the current subband gain corresponding to the current audio signal is compared with an initial subband gain value. When the current subband gain corresponding to the current audio signal is greater than the initial subband gain value, the initial subband gain value is used as the current subband gain of the current audio signal.

Step 210. Perform howling suppression on the target subband based on the current subband gain, to obtain a first target audio signal corresponding to the current time period.

The first target audio signal is an audio signal obtained after howling suppression is performed on a target subband in the current audio signal.

In some embodiments, a frequency spectrum of the target subband is amplified by using the current subband gain, and then a amplified audio signal is transformed from a frequency domain to a time domain by using an inverse Fourier transform algorithm, to obtain a first target audio signal corresponding to the current time period.

In an embodiment, the current audio signal corresponding to the current time period is acquired by using the acquisition device such as the microphone of the terminal. Therefore, the first target audio signal corresponding to the current time period may be encoded, to obtain an encoded audio signal, and then the encoded audio signal is sent to another voice call terminal through a network interface. For example, as shown in FIG. 1, the terminal 102 acquires an audio signal by using a microphone and performs echo cancellation and noise suppression to obtain a current audio signal corresponding to a current time period, then performs howling suppression on the current audio signal to obtain a first target audio signal corresponding to the current time period, and sends the first target audio signal corresponding to the current time period to the terminal 104 by using the server 106. The terminal 104 receives and decodes the first target audio signal corresponding to the current time period and then plays the decoded first target audio signal.

In an embodiment, after the first target audio signal is obtained, a volume of the first target audio signal may further be adjusted, for example, the volume of the first target audio signal may be increased, then the first target audio signal of which the volume is increased is encoded, and the encoded first target audio signal is sent to another voice call terminal through a network interface.

In an embodiment, the current audio signal corresponding to the current time period is sent by another voice call terminal through a network interface. Voice playing may be directly performed on the first target audio signal corresponding to the current time period. For example, as shown in FIG. 1, the terminal 102 acquires an audio signal by using a microphone, performs echo cancellation and noise suppression, and then encodes and sends the audio signal to the terminal 104 by using the server 106. After receiving the encoded audio signal, the terminal 104 decodes the encoded audio signal, to obtain a decoded audio signal, processes the decoded audio signal, to obtain a current audio signal corresponding to a current time period, performs howling suppression on the current audio signal, to obtain a first target audio signal corresponding to the current time period, and then plays the first target audio signal.

Figure 2A:
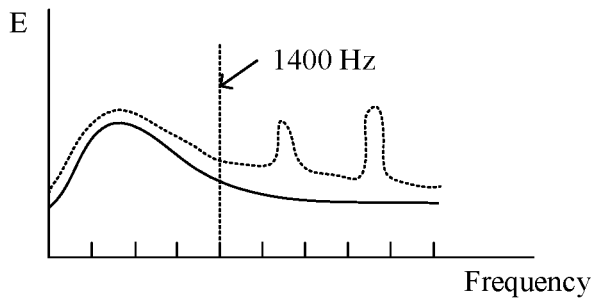
FIG. 2a is a schematic diagram of a relationship between a frequency and energy of an audio signal according to an embodiment.

In one embodiment, FIG. 2a is a schematic diagram of a relationship between a frequency and energy of an audio signal. In the schematic diagram, a horizontal coordinate represents a frequency, and a longitudinal coordinate represents energy. Different subbands are obtained through division based on frequencies, and nine subbands are shown in the figure. Subbands of which frequencies are lower than 1400 Hz are low frequency subbands, and subbands of which frequencies are higher than 1400 Hz are high frequency subbands. The low frequency subbands are a first subband to a fourth subband, and the high frequency subbands are a fifth subband to a ninth subband. A solid line in the figure represents a relationship curve between a frequency and energy when only a voice signal exists. A dashed line represents a relationship curve between a frequency and energy value when an audio signal has a voice signal and a howling signal exist. It can be learned that energy when the audio signal has the voice signal and the howling signal is obviously more than energy when the audio signal has only the voice signal. In this case, in the high frequency subbands, energy of the eighth subband is the largest, so that the eighth subband is determined as a target subband. Howling suppression is performed on the target subband. Because howling suppression has been performed on the eighth subband, the energy of the eighth subband is gradually reduced until energy of the sixth subband becomes maximum subband energy, the sixth subband is determined as the target subband, and then howling suppression is performed on the sixth subband.

According to the howling suppression method, a current audio signal corresponding to a current time period is obtained, and a current howling detection result and a current voice detection result that correspond to the current audio signal are obtained, so that a subband gain coefficient corresponding to the current audio signal can be determined according to the current howling detection result and the current voice detection result. In addition, a current subband gain corresponding to the current audio signal is calculated by using the subband gain coefficient and a past subband gain, to make the obtained current subband gain more accurate, and then howling suppression is performed on a target subband by using the current subband gain, to accurately suppress howling, to improve quality of an obtained first target audio signal corresponding to the current time period, thereby improving voice call quality.

Figure 3:
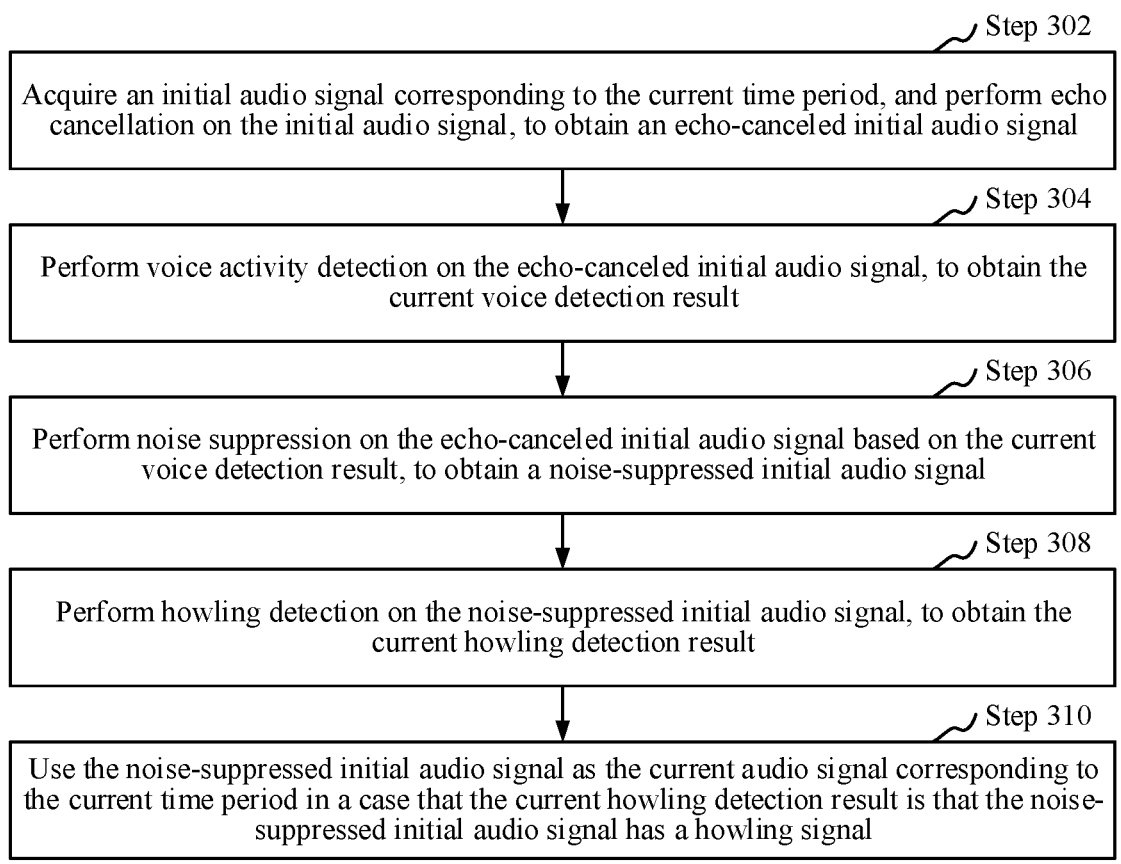
FIG. 3 is a schematic flowchart of obtaining a current audio signal according to an embodiment.

In an embodiment, as shown in FIG. 3, step 202 of obtaining a current audio signal corresponding to a current time period includes the following steps.

Step 302. Acquire an initial audio signal corresponding to the current time period, and perform echo cancellation on the initial audio signal, to obtain an echo-canceled initial audio signal.

The initial audio signal is a digital audio signal obtained by acquiring a user voice by using the acquisition device such as the microphone and converting the user voice.

In some embodiments, when the terminal is a voice transmitting terminal, the terminal acquires an initial audio signal corresponding to the current time period and performs echo cancellation on the initial audio signal by using an echo cancellation algorithm, to obtain an echo-canceled initial audio signal. The echo cancellation may be estimating an expected signal by using an adaptive algorithm, the expected signal being close to an echo signal passing through an actual echo path, that is, an analog echo signal, and then reducing the analog echo signal from the initial audio signal acquired by the acquisition device such as the microphone, to obtain the echo-canceled initial audio signal. The echo cancellation algorithm includes at least one of a least mean square (LMS) adaptive filtering algorithm, a recursive least square (RLS) adaptive filtering algorithm, or an affine projection adaptive filtering (APA) algorithm.

Step 304. Perform voice activity detection on the echo-canceled initial audio signal, to obtain the current voice detection result.

In some embodiments, the terminal performs voice activity detection on the echo-canceled initial audio signal by using a voice activity detection algorithm, to obtain the current voice detection result. The voice activity detection algorithm includes a double-threshold detection method, an energy-based endpoint detection algorithm, a cepstrum coefficient-based endpoint detection algorithm, a frequency band variance-based endpoint detection algorithm, an autocorrelation similar distance-based endpoint detection algorithm, an information entropy-based endpoint detection algorithm, and the like.

Step 306. Perform noise suppression on the echo-canceled initial audio signal based on the current voice detection result, to obtain a noise-suppressed initial audio signal.

In some embodiments, when the current voice detection result is that the echo-canceled initial audio signal does not include a voice signal, noise estimation is performed on the echo-canceled initial audio signal and noise is suppressed, to obtain a noise-suppressed initial audio signal. Noise suppression may be performed by using a trained neural network model for removing noise or noise suppression may be performed by using a filter. When the current voice detection result is that the echo-canceled initial audio signal includes the voice signal, the voice signal is maintained as much as possible and noise suppression is performed, to obtain a noise-suppressed initial audio signal. The voice signal is a signal corresponding to a user voice.

Step 308. Perform howling detection on the noise-suppressed initial audio signal, to obtain the current howling detection result.

In some embodiments, the terminal performs howling detection on the noise-suppressed initial audio signal by using a howling detection algorithm, to obtain the current howling detection result. The howling detection algorithm may be an energy distribution-based detection algorithm such as a peak-to-harmonic power ratio algorithm, a peak-to-neighboring power ratio algorithm, or an interframe peak magnitude persistence algorithm; or may be a neural network-based detection algorithm.

Step 310. Use the noise-suppressed initial audio signal as the current audio signal corresponding to the current time period when the current howling detection result is that the noise-suppressed initial audio signal has a howling signal.

In some embodiments, when detecting that the noise-suppressed initial audio signal has a howling signal, the terminal uses the noise-suppressed initial audio signal as the current audio signal corresponding to the current time period, and then performs howling suppression on the current audio signal corresponding to the current time period.

In the foregoing embodiments, echo cancellation is performed on an acquired initial audio signal, voice activity detection is performed on an echo-canceled initial audio signal, noise suppression is performed based on a current voice detection result, howling suppression is performed on a noise-suppressed initial audio signal, and when it is detected that the noise-suppressed initial audio signal has a howling signal, the noise-suppressed initial audio signal is used as a current audio signal corresponding to a current time period, to ensure that the obtained current audio signal is an audio signal on which howling suppression needs to be performed.

In an embodiment, step 304 of performing voice activity detection on the echo-canceled initial audio signal, to obtain the current voice detection result includes:

inputting the echo-canceled initial audio signal into a voice activity detection model for detection, to obtain the current voice detection result, the voice activity detection model being trained by using a neural network algorithm based on a training audio signal and a corresponding training voice detection result.

The neural network algorithm may be a back propagation (BP) neural network algorithm, a long short-term memory (LSTM) artificial neural network algorithm, a recurrent neural network (RNN) algorithm, or the like. The training audio signal is an audio signal used when the voice activity detection model is trained, the training voice detection result is a voice detection result corresponding to the training audio signal, and the training voice detection result includes that the training audio signal includes a voice signal, and the training audio signal does not include the voice signal. A loss function adopts a cross-entropy loss function and is optimized by using a gradient descent algorithm, and an activation function adopts an S-type function.

In some embodiments, the terminal extracts an audio feature in the echo-canceled initial audio signal through wavelet analysis, the audio feature including a short-time zero-crossing rate, short-time energy, kurtosis of a short-time magnitude spectrum, skewness of the short-time magnitude spectrum, and the like, and inputs the audio feature into a voice activity detection model for detection, to output a current voice detection result. The current voice detection result includes that the echo-canceled initial audio signal includes a voice signal and the echo-canceled initial audio signal does not include the voice signal. The voice activity detection model is trained by using a neural network algorithm based on a training audio signal and a corresponding training voice detection result. The voice activity detection model may be trained by using a neural network algorithm based on a training audio signal and a corresponding training voice detection result and stored in the server. The terminal obtains the voice activity detection model from the server for use. Alternatively, the voice activity detection model may be trained by using a neural network algorithm based on a training audio signal and a corresponding training voice detection result in the terminal.

In an embodiment, step 304 of performing voice activity detection on the echo-canceled initial audio signal, to obtain the current voice detection result includes:

performing low-pass filtering on the echo-canceled initial audio signal, to obtain a low frequency signal; and calculating signal energy corresponding to the low frequency signal, calculating an energy fluctuation based on the signal energy, and determining the current voice detection result according to the energy fluctuation.

The low-pass filtering is a filtering method, and a rule is that a low frequency signal can pass normally, while a high frequency signal exceeding a set threshold value is blocked and weakened. However, an amplitude of blocking and weakening varies according to different frequencies and different filtering procedures (purposes). The signal energy is short-time energy corresponding to the low frequency signal. The energy fluctuation is a ratio of signal energy of a low frequency signal of the former frame to signal energy of a low frequency signal of the later frame.

In some embodiments, energy distribution of a voice signal and a howling signal in an audio signal is different, and low frequency energy of the howling signal is obviously weaker than that of the voice signal. Therefore, the terminal performs low-pass filtering on the echo-canceled initial audio signal according to a preset low frequency value, to obtain a low frequency signal, the preset low frequency value being 500 Hz. Subsequently, signal energy corresponding to each frame in the low frequency signal may be calculated through triangular filtering. Next, a ratio of signal energy corresponding to the former frame to signal energy corresponding to the later frame is calculated. When the ratio exceeds a preset energy ratio, it indicates that the echo-canceled initial audio signal includes the voice signal, and when the ratio does not exceed the preset energy ratio, it indicates that the echo-canceled initial audio signal does not include the voice signal, so that the current voice detection result is obtained.

In the foregoing embodiments, low-pass filtering is performed on the echo-canceled initial audio signal, to obtain a low frequency signal, and then the current voice detection result is determined according to an energy fluctuation of the low frequency signal, to enable the obtained current voice detection result to be more accurate.

In an embodiment, step 304 of performing voice activity detection on the echo-canceled initial audio signal, to obtain the current voice detection result includes:

performing low-pass filtering on the echo-canceled initial audio signal, to obtain a low frequency signal, performing pitch detection on the low frequency signal, to obtain a pitch period, and determining the current voice detection result according to the pitch period.

Generally, a voice is compounded by a series of vibrations that have different frequencies and amplitudes and that are generated by an acoustic source. One of the vibrations has a lowest frequency, a tone emitted by the vibration is a fundamental tone, and the remaining are harmonics. The pitch detection indicates estimating a pitch period and is used for detecting a track curve that is completely consistent with or as close as possible to a vocal cord vibration frequency. The pitch period is a time when a vocal cord is opened and closed once.

In some embodiments, the terminal performs low-pass filtering on the echo-canceled initial audio signal, to obtain a low frequency signal, and performs pitch detection on the low frequency signal by using a pitch detection algorithm, to obtain a pitch period. The pitch detection algorithm may include an autocorrelation algorithm, an average magnitude difference function algorithm, a parallel processing algorithm, a cepstrum algorithm, and a simple inverse filtering tracking method. Subsequently, the terminal determines, according to the pitch period, whether the echo-canceled initial audio signal includes a voice signal. That is, if the pitch period can be detected, it indicates that the echo-canceled initial audio signal includes the voice signal, and if the pitch period cannot be detected, it indicates that the echo-canceled initial audio signal does not include the voice signal, so that the current voice detection result is obtained.

In the foregoing embodiments, the current voice detection result is obtained by detecting a pitch period, to improve accuracy of the obtained current voice detection result.

In an embodiment, step 308 of performing howling detection on the noise-suppressed initial audio signal, to obtain the current howling detection result includes:

inputting the noise-suppressed initial audio signal into a howling detection model for detection, to obtain the current howling detection result, the howling detection model being trained by using a neural network algorithm based on a howling training audio signal and a corresponding training howling detection result.

The neural network algorithm may be a back propagation (BP) neural network algorithm, a long short-term memory (LSTM) artificial neural network algorithm, a recurrent neural network (RNN) algorithm, or the like. The howling training audio signal is an audio signal used when the howling detection model is trained. The training howling detection result is a howling detection result corresponding to the howling training audio signal and includes that the noise-suppressed initial audio signal includes a howling signal and the noise-suppressed initial audio signal does not include the howling signal.

In some embodiments, the terminal may extract an audio feature corresponding to the noise-suppressed initial audio signal, the audio feature including a mel-frequency cepstrum coefficient (MFCC) dynamic feature, band representative vectors, and audio fingerprints of various types, the mel-frequency cepstrum coefficient being a coefficient form a mel-frequency cepstrum. The audio fingerprint is obtained by extracting a digital feature in the noise-suppressed initial audio signal in a form of an identifier by using an algorithm, and the band representative vector is an index list of prominent tones in an ordered band. The terminal inputs the extracted audio feature into a howling detection model for detection, to obtain the current howling detection result.

In the foregoing embodiments, howling detection is performed on the noise-suppressed initial audio signal by using a howling detection model, to improve efficiency and accuracy of detecting howling.

Figure 4:
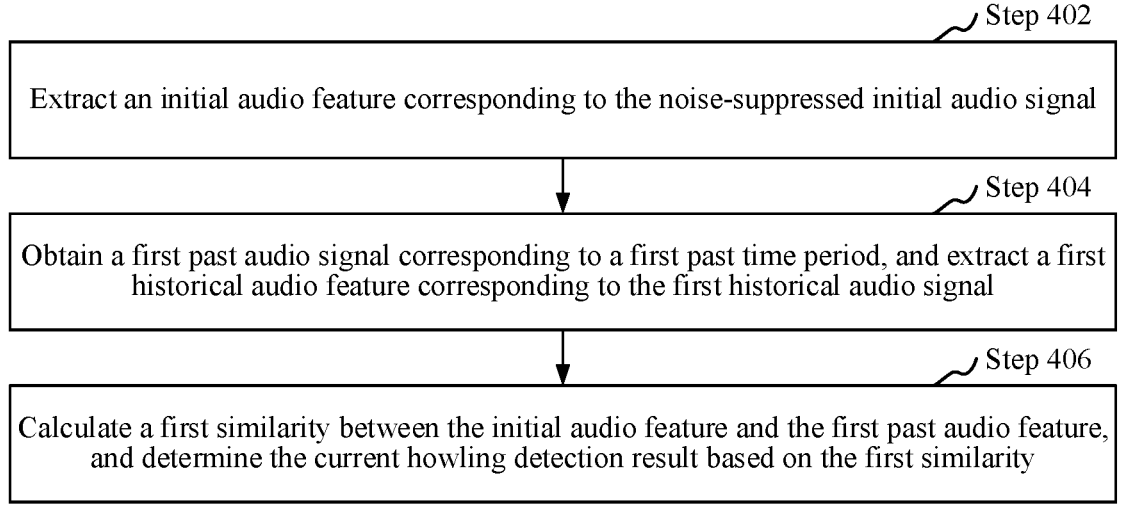
FIG. 4 is a schematic flowchart of howling detection according to an embodiment.

In an embodiment, as shown in FIG. 4, step 308 of performing howling detection on the noise-suppressed initial audio signal, to obtain the current howling detection result includes the following steps.

Step 402. Extract an initial audio feature corresponding to the noise-suppressed initial audio signal.

The initial audio feature is an audio feature extracted from the noise-suppressed initial audio signal, the initial audio feature including at least one of a mel-frequency cepstrum coefficient (MFCC) dynamic feature, band representative vectors, or audio fingerprints of various types.

In an embodiment, the terminal may alternatively select a corresponding audio feature according to accuracy and a calculation amount. When a calculation resource of the terminal is limited, the band representative vectors and the audio fingerprints of various types are used as the initial audio features, and when relatively high accuracy is required, all the mel-frequency cepstrum coefficient dynamic feature, the band representative vectors, and the audio fingerprints of various types may be used as the initial audio features.

In some embodiments, the terminal extracts an initial audio feature corresponding to the noise-suppressed initial audio signal, for example, extracts the mel-frequency cepstrum coefficient dynamic feature. The noise-suppressed initial audio signal may be pre-emphasized, framing is performed, windowing is performed on each frame, fast Fourier transform is performed on a windowed result, to obtain a result of the transformation, logarithmic energy is calculated for the result of the transformation through triangular filtering, and then discrete cosine transform is performed on the logarithmic energy to obtain the mel-frequency cepstrum coefficient dynamic feature.

Step 404. Obtain a first past audio signal corresponding to a first past time period, and extract a first past audio feature corresponding to the first past audio signal.

The first past time period is a time period before the current time period and has a same time length as the current time period, and there may be a plurality of first past time periods. For example, a current call time is 2500 ms. The length of the current time period is 300 ms, that is, the current time period is from 2200 ms to 2500 ms, and a preset interval is 20 ms, so that the first past time period may be 200 ms to 500 ms, 220 ms to 520 ms, 240 ms to 540 ms, . . . , 1980 ms to 2280 ms, and 2000 ms to 2300 ms. The first past audio signal is a past audio signal corresponding to the first past time period and is an audio signal acquired by using the microphone within the first past time period. The first past audio feature is an audio feature corresponding to the first past audio signal, and may include at least one of a mel-frequency cepstrum coefficient (MFCC) dynamic feature, band representative vectors, or audio fingerprints of various types.

In some embodiments, the terminal may obtain a first past audio signal corresponding to a first past time period from a cache or may download a first past audio signal corresponding to a first past time period from the server, and then extracts a first past audio feature corresponding to the first past audio signal.

Step 406. Calculate a first similarity measure between the initial audio feature and the first past audio feature, and determine the current howling detection result based on the first similarity measure.

The first similarity measure is a similarity between the initial audio feature and the first past audio feature, and the similarity may be a distance similarity or may be a cosine similarity.

In some embodiments, the terminal may calculate a first similarity measure between the initial audio feature and the first past audio feature by using a similarity algorithm. When the first similarity measure exceeds a preset first similarity measure threshold, it indicates that the noise-suppressed initial audio signal has the howling signal, and when the first similarity measure does not exceed the preset first similarity measure threshold, it indicates that the noise-suppressed initial audio signal has no howling signal, so that the current howling detection result is obtained.

In an embodiment, when there are a plurality of first past time periods, a plurality of first past audio signals may be obtained, a first past audio feature corresponding to each first past audio signal is calculated, a first similarity measure between each first past audio feature and the initial audio feature is calculated, and a duration when the first similarity measure exceeds the preset first similarity measure threshold is calculated. When the duration exceeds a preset duration, it indicates that the noise-suppressed initial audio signal has the howling signal, and when the duration does not exceed the preset duration, it indicates that the noise-suppressed initial audio signal has no howling signal, so that the current howling detection result is obtained.

In the foregoing embodiments, a first similarity measure between the initial audio feature and the first past audio feature is calculated. Because a howling signal is transmitted circularly between a voice transmitting terminal and a voice receiving terminal, the howling signal has a past similarity. Then the current howling detection result is determined based on the first similarity measure, to make the obtained current howling detection result more accurate.

In an embodiment, the howling suppression method further includes the following steps:

obtaining an audio signal to be played and a preset audio watermark signal when the current howling detection result is that the current audio signal has a howling signal, and adding the preset audio watermark signal to the audio signal to be played and playing the audio signal to be played.

The audio signal to be played is an audio signal to be played by the terminal by using a playback device while a user speaks. The audio signal is a signal that can be perceived by the human ear (for example, playing a speaking voice of the other party) or not easily perceived (for example, quiet background sound when the other party is not speaking). The preset audio watermark signal is a preset audio signal used for representing that an audio signal sent through a network has a howling signal and is a signal that is not easily perceived by the human ear. For example, the preset audio watermark signal may be a high frequency watermark signal selected from a high frequency band even an ultrasonic frequency band.

In some embodiments, because the transmitting terminal detects howling and perform howling suppression, when there are a plurality of voice signal receiving terminals, audio signals received by all the voice signal receiving terminals are howling-suppressed audio signals, affecting quality of the audio signals of all the receiving terminals. In this case, the transmitting terminal does not perform howling suppression when detecting that a current audio signal has a howling signal, obtains an audio signal to be played and a preset audio watermark signal, and adds the preset audio watermark signal to the audio signal to be played and plays the audio signal to be played, and then directly sends the current audio signal to all the receiving terminals through a network rather than performing howling suppression on the current audio signal. In an embodiment, a single frequency tone or a multi-frequency tone of a preset frequency may be embedded into a high frequency band of the audio signal to be played as the preset high frequency watermark signal. In an embodiment, a plurality of preset high frequency watermark signals may be embedded into the audio signal to be played for playing. In an embodiment, the preset audio watermark signal may alternatively be added to the audio signal to be played by using a time domain audio watermarking algorithm. In an embodiment, the preset audio watermark signal may alternatively be added to the audio signal to be played by using a transform domain audio watermarking algorithm. The receiving terminal that generates howling is relatively close to the transmitting terminal. In this case, the receiving terminal that generates howling can receive an audio signal to which the preset audio watermark signal is added and the current audio signal. Subsequently, the receiving terminal that generates howling detects the audio signal to which the preset audio watermark signal is added, to obtain a result indicating that the current audio signal has the howling signal, and then suppresses the current audio signal, to obtain and play the first target audio signal, to avoid reducing the quality of the audio signals received by all the receiving terminals.

Figure 5:
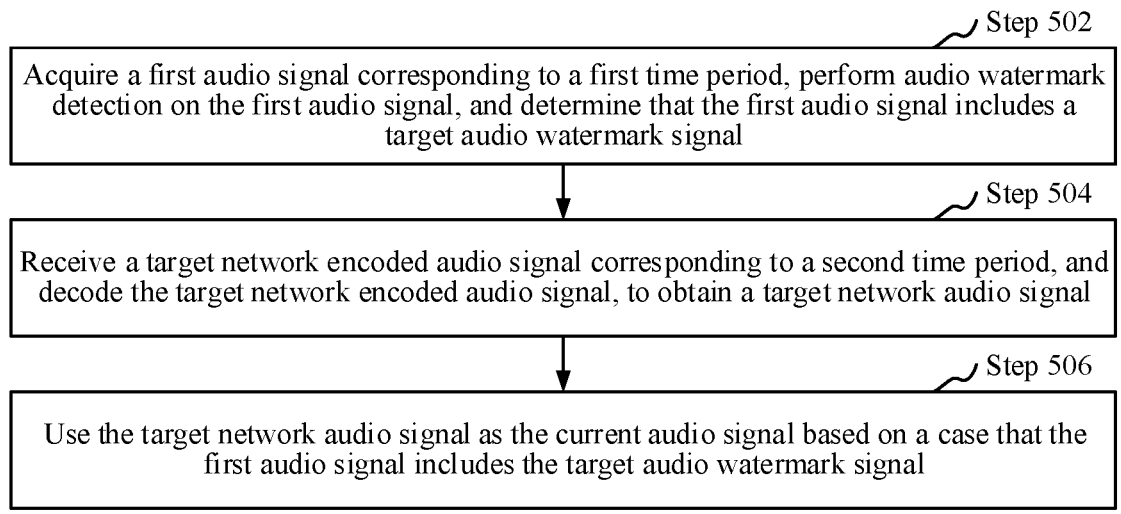
FIG. 5 is a schematic flowchart of obtaining a current audio signal according to an embodiment.

In an embodiment, as shown in FIG. 5, the howling suppression method further includes the following steps.

502. Acquire a first audio signal corresponding to a first time period, perform audio watermark detection on the first audio signal, and determine that the first audio signal includes a target audio watermark signal.

The first audio signal is an audio signal sent by a relatively close terminal by using a playback device and acquired by using the acquisition device such as the microphone, and howling may be generated between the terminal and the relatively close terminal. The audio watermark detection may be performing detection by using an audio watermark detection algorithm. The audio watermark detection algorithm is used for detecting an audio watermark signal added to the first audio signal and may be an adjacent band energy ratio algorithm. The adjacent band energy ratio algorithm may be calculating a ratio of energy corresponding to each subband in the first audio signal, and extracting the audio watermark signal according to the ratio. The target audio watermark signal is a preset audio watermark signal added to the first audio signal by the relatively close terminal. The first time period is a time period corresponding to the first audio signal.

In some embodiments, when the terminal is a voice receiving terminal, the terminal acquires a first audio signal corresponding to a first time period by using the acquisition device such as the microphone. Subband division is performed on the first audio signal, energy of each subband is calculated, then energy of adjacent subbands is compared, to obtain an adjacent band energy ratio, and when the adjacent band energy ratio exceeds a preset adjacent band energy ratio threshold, it is determined that the first audio signal includes a target high frequency watermark signal. In this case, it indicates that the audio signal received through a network has a howling signal. The preset adjacent band energy ratio threshold is a preset adjacent band energy ratio threshold and is used for detecting whether a preset high frequency watermark signal is included. In an embodiment, the audio watermark signal added to the first audio signal may alternatively be detected by using a watermark extraction algorithm.

504. Receive a target network encoded audio signal corresponding to a second time period, and decode the target network encoded audio signal, to obtain a target network audio signal.

The second time period is a time period corresponding to the target network encoded audio signal. The second time period is later than the first time period. The target network encoded audio signal is an encoded current audio signal received through a network. The target network audio signal is a current audio signal obtained by decoding the target network encoded audio signal.

In some embodiments, the terminal receives a target network encoded audio signal corresponding to a second time period through a network, and decodes the target network encoded audio signal, to obtain a target network audio signal.

506. Use the target network audio signal as the current audio signal based on a case that the first audio signal includes the target audio watermark signal.

In some embodiments, the terminal uses the target network audio signal as the current audio signal based on a case that the first audio signal includes the target audio watermark signal.

In the foregoing embodiments, when being a voice receiving terminal, the terminal may detect a preset audio watermark signal by using an acquired first audio signal, use a target network audio signal received through a network as a current audio signal when detecting that the first audio signal has a preset audio watermark signal, and then performs howling suppression on the current audio signal, to avoid affecting quality of audio signals received by all terminals, and determines, by detecting the preset audio watermark signal, whether the target network audio signal is used as the current audio signal, to improve accuracy of the obtained current audio signal.

Figure 6:
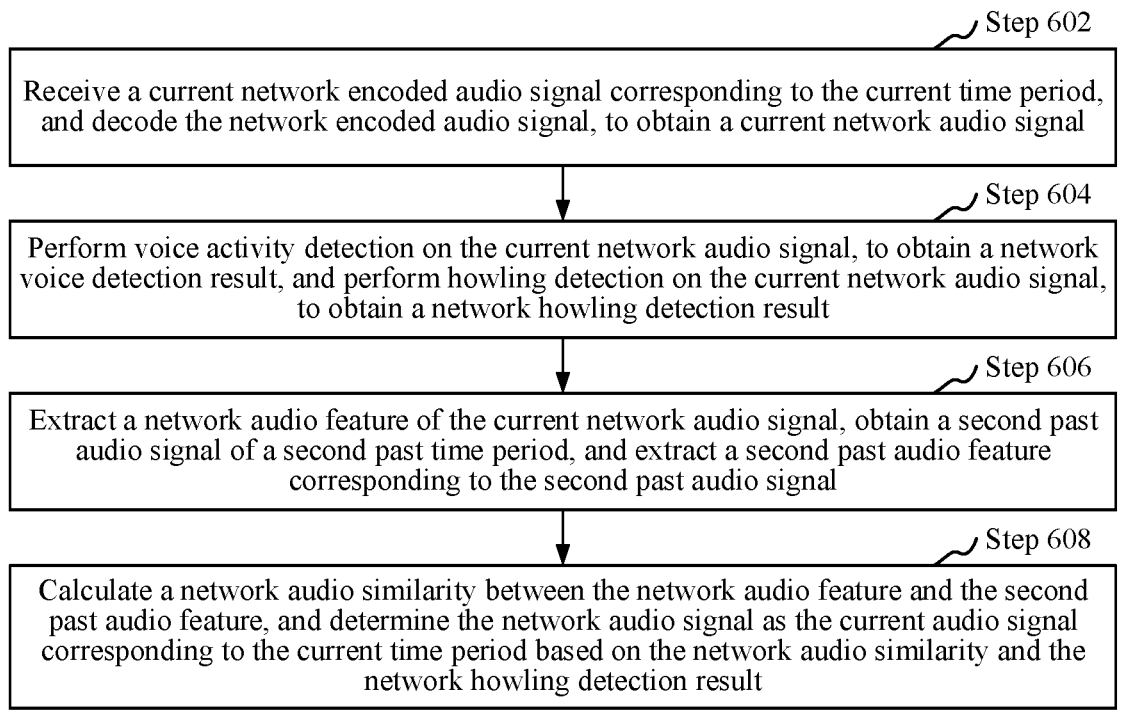
FIG. 6 is a schematic flowchart of obtaining a current audio signal according to an embodiment.

In an embodiment, as shown in FIG. 6, step 202 of obtaining a current audio signal corresponding to a current time period includes the following steps.

Step 602. Receive a current network encoded audio signal corresponding to the current time period, and decode the network encoded audio signal, to obtain a current network audio signal.

The current time period is a time period when the terminal receives the current network encoded audio signal through a network. The current network encoded audio signal is an encoded audio signal received through a network.

In some embodiments, when the terminal is a voice receiving terminal, the terminal receives a current network encoded audio signal corresponding to the current time period through a network interface, and decodes the network encoded audio signal, to obtain a current network audio signal.

Step 604. Perform voice activity detection on the current network audio signal, to obtain a network voice detection result, and perform howling detection on the current network audio signal, to obtain a network howling detection result.

The network voice detection result is a result obtained by performing voice activity detection on the current network audio signal and includes that the current network audio signal includes a voice signal, and the current network audio signal does not include the voice signal. The network howling detection result is a result obtained by performing howling detection on the current network audio signal and may include that the current network audio signal includes a howling signal, and the current network audio signal does not include the howling signal.

In an embodiment, voice activity detection is performed on the current network audio signal by using a voice activity detection model, to obtain a network voice detection result, and howling detection is performed on the current network audio signal by using a howling detection model, to obtain a network howling detection result.

In an embodiment, low-pass filtering may be performed on the current network audio signal, to obtain a low frequency signal, signal energy corresponding to the low frequency signal is calculated, an energy fluctuation is calculated based on the signal energy, and a network voice detection result corresponding to the current network audio signal is determined according to the energy fluctuation.

In an embodiment, low-pass filtering may be performed on the current network audio signal, to obtain a low frequency signal, pitch detection is performed on the low frequency signal, to obtain a pitch period, and a network voice detection result corresponding to the current network audio signal is determined based on the pitch period.

In an embodiment, a current network audio feature corresponding to the current network audio signal may be extracted, and a past network audio feature is obtained, a similarity between the past network audio feature and the current network audio feature is calculated, and a network howling detection result is determined based on the similarity.

Step 606. Extract a network audio feature of the current network audio signal, obtain a second past audio signal of a second past time period, and extract a second past audio feature corresponding to the second past audio signal.

The network audio feature is an audio feature corresponding to the current network audio signal. The second past time period is a time period corresponding to the second past audio signal, and there may be a plurality of second past time periods. The second past audio signal is a past audio signal acquired by the acquisition device such as the microphone. The second past audio feature is an audio feature corresponding to the second past audio signal.

In some embodiments, the terminal extracts a network audio feature of the current network audio signal, obtains a second past audio signal of a second past time period stored in an internal memory, and extracts a second past audio feature corresponding to the second past audio signal.

Step 608. Calculate a network audio similarity measure between the network audio feature and the second past audio feature, and determine the network audio signal as the current audio signal corresponding to the current time period based on the network audio similarity measure and the network howling detection result.

The network audio similarity measure is a similarity between the current network audio signal and the second past audio signal, and a higher network audio similarity measure indicates a closer distance between the terminal and the terminal for transmitting the current network audio signal.

In some embodiments, the terminal calculates a network audio similarity measure between the network audio feature and the second past audio feature by using a similarity algorithm and uses the network audio signal as the current audio signal corresponding to the current time period when the network audio similarity measure exceeds a preset network audio similarity measure threshold and the network howling detection result is that the current network audio signal has a howling signal. The preset network audio similarity measure threshold is a threshold used for determining positions of the terminal and the terminal for transmitting the current network audio signal. When the network audio similarity measure exceeds the preset network audio similarity measure threshold, it indicates that the terminal is close to the terminal for transmitting the current network audio signal, and howling is easily generated. When the network audio similarity measure does not exceed the preset network audio similarity measure threshold, it indicates that the terminal is relatively far away from the terminal for transmitting the current network audio signal, and howling is not easily generated.

In an embodiment, the terminal may obtain a plurality of second past audio signals, extract a second past audio feature corresponding to each second past audio signal, and calculate a network audio similarity measure between each second past audio feature and the network audio feature. When a duration for which the network audio similarity measure exceeds the preset network audio similarity measure threshold exceeds a preset threshold, it indicates that the terminal is close to the terminal for transmitting the current network audio signal, and when the duration for which the network audio similarity measure exceeds the preset network audio similarity measure threshold does not exceed the preset threshold, it indicates that the terminal is relatively far away from the terminal for transmitting the current network audio signal. The plurality of means at least two.

In the foregoing embodiments, a network audio similarity measure between the network audio feature and the second past audio feature is calculated, and the network audio signal is determined as the current audio signal corresponding to the current time period based on the network audio similarity measure and the network howling detection result, to make the determined current audio signal more accurate.

In an embodiment, step 204 of dividing the frequency domain audio signal, to obtain subbands, and determining a target subband from the subbands includes:
dividing the frequency domain audio signal according to a preset quantity of subbands, to obtain the subbands; calculating subband energy corresponding to the subbands, and smoothing the subband energy, to obtain smoothed subband energy; and determining the target subband based on the smoothed subband energy.

The preset quantity of subbands is a preset quantity of subbands to be divided.

In some embodiments, the terminal unevenly divides the frequency domain audio signal according to a preset quantity of subbands, to obtain the subbands. The terminal calculates subband energy corresponding to the subbands, the subband energy being a volume or logarithmic energy. That is, in an embodiment, the subband energy corresponding to the subbands may be calculated by using a triangular filter. For example, energy of each subband may be calculated by using 30 triangular filters. Frequency ranges of the subbands may not be equal, and frequencies of adjacent subbands may overlap. Subsequently, each subband energy is smoothed, that is, energy corresponding to subbands at a same position existing in a recent time period is obtained, and then an average value is calculated, to obtain the smoothed subband energy of the subband. For example, subband energy of a first subband in a current audio signal needs to be smoothed, that is, past subband energy of first subbands in recent 10 past audio signals may be obtained, then average subband energy is calculated, and the average subband energy is used as the smoothed subband energy of the first subband in the current audio signal. Smoothed subband energy corresponding to each subband is calculated sequentially.

Subsequently, the smoothed subband energy is compared, to select a subband with maximum subband energy as a target subband, the target subband including maximum howling energy. In an embodiment, a subband with maximum subband energy may be selected starting from a designated subband. For example, the current audio signal is divided into 30 subbands, and a subband with maximum smoothed subband energy may be selected from a sixth subband to a $30^{th}$ subband. In an embodiment, a preset quantity of subbands may be selected as target subbands in descending order of results of the comparison. For example, first three subbands are selected as target subbands in descending order of subband energy.

In the foregoing embodiments, subband energy is smoothed, and a target subband is selected from subbands according to the smoothed subband energy, to make the selected target subband more accurate.

In an embodiment, the determining the target subband based on the smoothed subband energy includes:
obtaining the current howling detection result corresponding to the current audio signal, determining howling subbands from the subbands according to the current howling detection result, and obtaining howling subband energy; and selecting target energy from the howling subband energy, and using a target howling subband corresponding to the target energy as the target subband.

The howling subband is a subband including a howling signal. The howling subband energy is energy corresponding to the howling subband. The target energy is maximum howling subband energy. The target howling subband is a howling subband corresponding to the maximum howling subband energy.

In some embodiments, the terminal obtains the current howling detection result corresponding to the current audio signal, when the current howling detection result is that the current audio signal has the howling signal, determines subbands corresponding to the howling signal from the subbands according to a frequency of the howling signal and a frequency of a voice signal, to obtain howling subbands.

Then, energy corresponding to the howling subbands is determined according to the energy of the subbands. Next, the howling subband energy is compared, to select maximum howling subband energy as target energy, and a target howling subband corresponding to the target energy is used as the target subband.

In an embodiment, howling subbands corresponding to howling subband energy may be directly used as target subbands, that is, subband gain coefficients corresponding to the howling subbands are calculated, and past subband gains corresponding to the howling subbands are obtained, products of the subband gain coefficients and the past subband gains are calculated, to obtain current subband gains corresponding to the howling subbands, and howling suppression is performed on the howling subbands based on the current subband gains, to obtain first target audio signals.

In the foregoing embodiments, howling subbands are determined from subbands by using the current howling detection result, and then a target subband is determined from the howling subbands, to improve accuracy of the obtained target subband.

Figure 7:
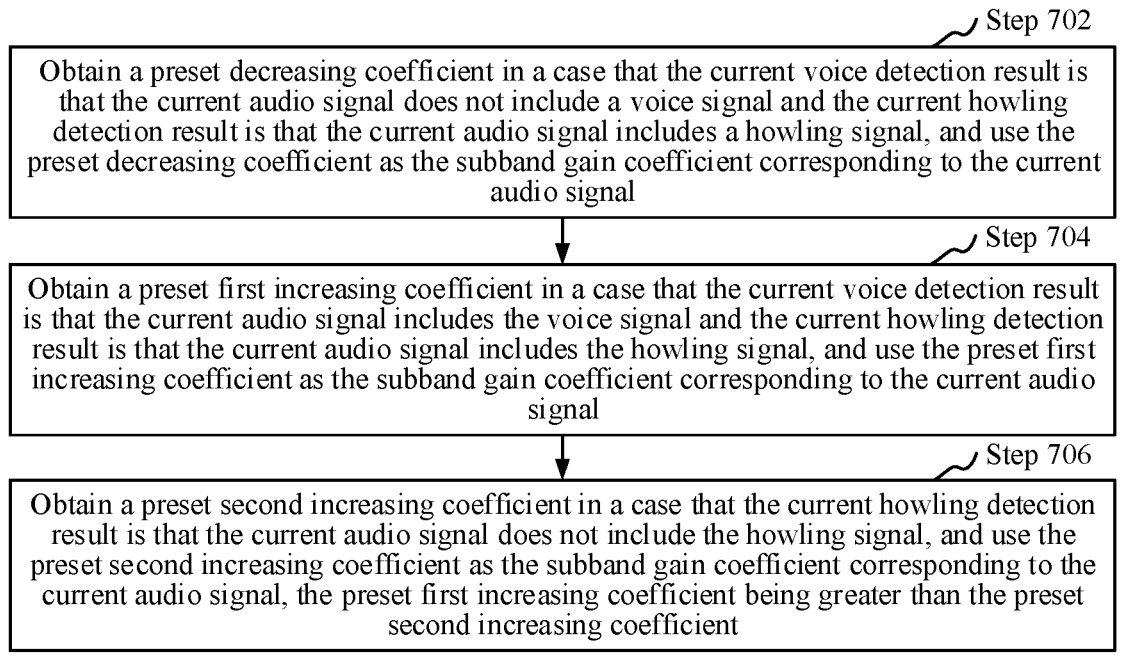
FIG. 7 is a schematic flowchart of obtaining a subband gain coefficient according to an embodiment.

In an embodiment, as shown in FIG. 7, step 206 of determining a subband gain coefficient corresponding to the current audio signal based on the current howling detection result and the current voice detection result includes:

Step 702. Obtain a preset decreasing coefficient when the current voice detection result is that the current audio signal does not include a voice signal and the current howling detection result is that the current audio signal includes a howling signal, and use the preset decreasing coefficient as the subband gain coefficient corresponding to the current audio signal.

The preset decreasing coefficient is a preset coefficient for decreasing a subband gain and may be a value less than 1.

In some embodiments, when detecting that the current audio signal does not include a voice signal and the current audio signal includes a howling signal, the terminal obtains a preset decreasing coefficient and uses the preset decreasing coefficient as the subband gain coefficient corresponding to the current audio signal. That is, when it is detected that the current audio signal does not include the voice signal and the current audio signal includes the howling signal, a subband gain needs to be gradually decreased from an initial value until the current audio signal does not include the howling signal or the subband gain of the current audio signal reaches a preset lower limit value, for example, 0.08.

Step 704. Obtain a preset first increasing coefficient when the current voice detection result is that the current audio signal includes the voice signal and the current howling detection result is that the current audio signal includes the howling signal, and use the preset first increasing coefficient as the subband gain coefficient corresponding to the current audio signal.

Step 706. Obtain a preset second increasing coefficient when the current howling detection result is that the current audio signal does not include the howling signal, and use the preset second increasing coefficient as the subband gain coefficient corresponding to the current audio signal, the preset first increasing coefficient being greater than the preset second increasing coefficient.

The preset first increasing coefficient is a preset coefficient for increasing a subband gain when the current audio signal includes the voice signal and the howling signal. The preset second increasing coefficient is a preset coefficient for increasing a subband gain when the current audio signal does not include the howling signal. The preset first increasing coefficient is greater than the preset second increasing coefficient.

In some embodiments, when detecting that the current audio signal includes the voice signal and the howling signal, the terminal uses a preset first increasing coefficient as the subband gain coefficient corresponding to the current audio signal. In this case, to protect quality of the voice signal, the subband gain needs to be quickly increased, to allow the subband gain to be restored to the initial value. When detecting that the current audio signal does not include the howling signal, the terminal uses a preset second increasing coefficient as the subband gain coefficient corresponding to the current audio signal. In this case, the subband gain of the current audio signal is restored to the initial value according to the preset second increasing coefficient. The preset first increasing coefficient is greater than the preset second increasing coefficient, and it indicates that a speed at which the subband gain is restored to the initial value when the current audio signal includes the voice signal and the howling signal is greater than a restoration speed when the current audio signal does not include the howling signal. For example, during a voice call, a current audio signal is obtained every 20 ms, and a subband gain of the current audio signal is calculated. At the beginning of the voice call, a howling signal does not exist, and the subband gain keeps unchanged. Then, when it is detected that the howling signal exists and a voice signal is not included, the subband gain of the current audio signal is gradually decreased from an initial value according to a preset decreasing coefficient, and then when it is detected that the howling signal exists and the voice signal is included, the subband gain of the current audio signal is calculated according to a preset first increasing coefficient, that is, the subband gain of the current audio signal is increased rapidly, so that the subband gain is restored to the initial value.

In the foregoing embodiments, a subband gain coefficient is determined according to the current voice detection result and the current howling detection result, to enable the obtained subband gain coefficient to be more accurate and howling suppression to be more accurate, thereby further improving quality of the obtained first target audio signal.

Figure 8:
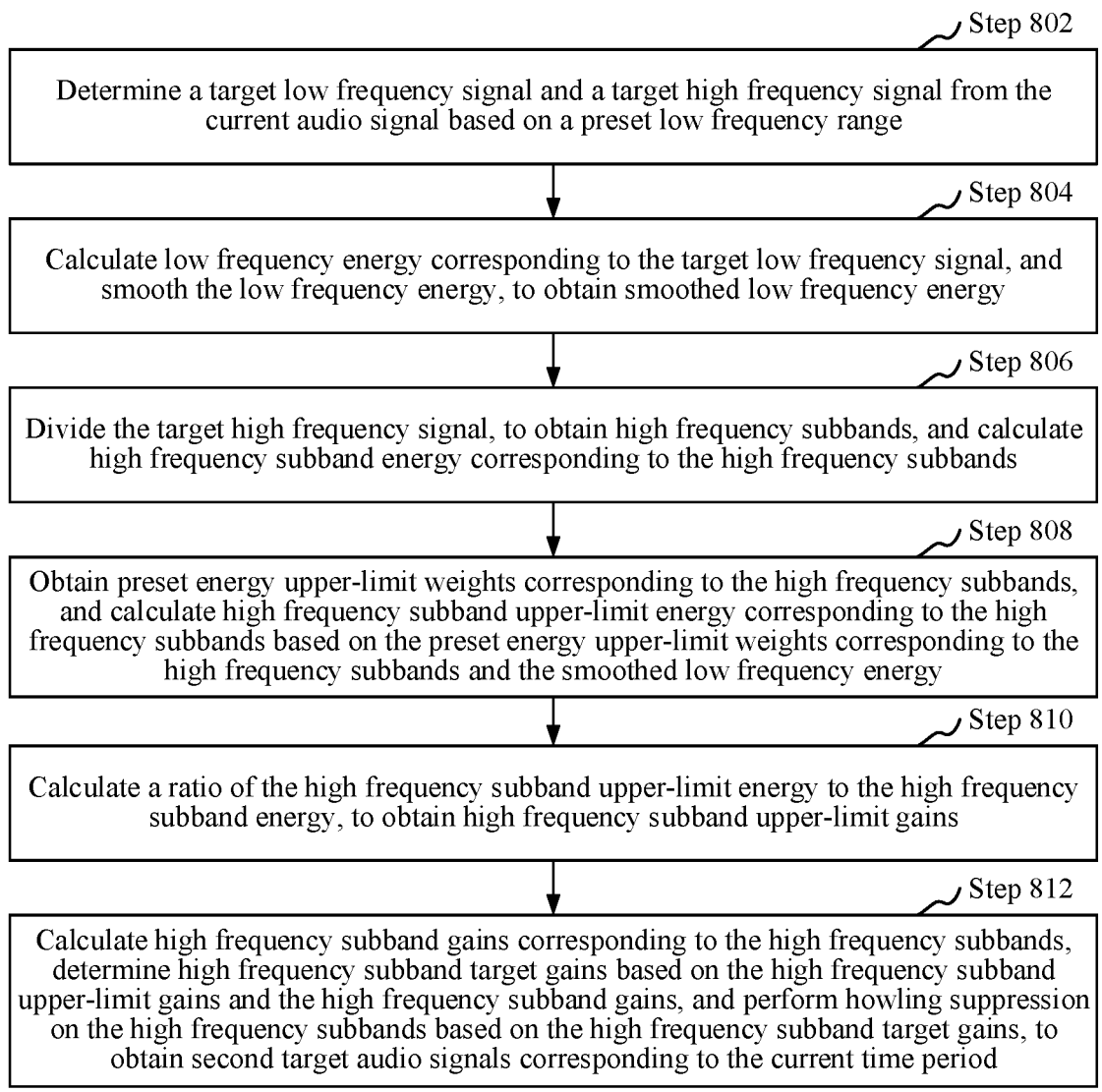
FIG. 8 is a schematic flowchart of obtaining a second target audio signal according to an embodiment.

In an embodiment, as shown in FIG. 8, the howling suppression method further includes the following steps.

Step 802. Determine a target low frequency signal and a target high frequency signal from the current audio signal based on a preset low frequency range.

The preset low frequency range is a preset human voice frequency range, for example, less than 1400 Hz. The target low frequency signal is an audio signal within the preset low frequency range in the current audio signal, and the target high frequency signal is an audio signal exceeding the preset low frequency range in the current audio signal.

In some embodiments, the terminal divides the current audio signal according to a preset low frequency range, to obtain a target low frequency signal and a target high frequency signal. For example, an audio signal of which a frequency is less than 1400 Hz in the current audio signal is used as the target low frequency signal, and an audio signal of which a frequency exceeds 1400 Hz in the current audio signal is used as the target high frequency signal.

Step 804. Calculate low frequency energy corresponding to the target low frequency signal, and smooth the low frequency energy, to obtain smoothed low frequency energy.

The low frequency energy is energy corresponding to the target low frequency signal.

In some embodiments, the terminal directly calculates low frequency energy corresponding to the target low frequency signal or may divide the target low frequency signal, to obtain subbands of low frequency signals, then calculate energy corresponding to the subbands of the low frequency signals, and then calculate a sum of the energy corresponding to the subbands of the low frequency signals, to obtain low frequency energy corresponding to the target low frequency signal. Then, the terminal smooths the low frequency energy, to obtain smoothed low frequency energy. Smoothing may be performed by using the following formula (1)

$$E_v(t)=a*E_v(t-1)+(1-a)*E_c \qquad \text{formula (1)}$$

where $E_v(t)$ is smoothed low frequency energy corresponding to a target low frequency signal in a current audio signal corresponding to a current time period. $E_v(t-1)$ is past low frequency energy corresponding to a past low frequency signal in a past audio signal corresponding to a previous past time period. $E_c$ is low frequency energy corresponding to the target low frequency signal in the current audio signal corresponding to the current time period. a is a smoothing coefficient and is preset. A value of a when $E_c$ may be greater than $E_v(t-1)$ is different from a value of a when $E_c$ is less than $E_v(t-1)$ for better tracking a rising section and a falling section of energy.

Step 806. Divide the target high frequency signal, to obtain high frequency subbands, and calculate high frequency subband energy corresponding to the high frequency subbands.

In some embodiments, the terminal may divide the target high frequency signal, to obtain high frequency subbands, and calculate high frequency subband energy corresponding to the high frequency subbands by using a triangular filter.

Step 808. Obtain preset energy upper-limit weights corresponding to the high frequency subbands, and calculate high frequency subband upper-limit energy corresponding to the high frequency subbands based on the preset energy upper-limit weights corresponding to the high frequency subbands and the smoothed low frequency energy.

The preset energy upper-limit weight is a preset energy upper-limit weight of a high frequency subband, different high frequency subbands have different preset energy upper-limit weights, and the high frequency subbands may be set in ascending order of frequencies and energy upper-limit weights are reduced sequentially. The high frequency subband upper-limit energy is an upper limit of high frequency subband energy, and the high frequency subband energy cannot exceed the upper limit.

In some embodiments, the terminal obtains preset energy upper-limit weights corresponding to the high frequency subbands and calculates a product of the preset energy upper-limit weights corresponding to the high frequency subbands and the smoothed low frequency energy, to obtain high frequency subband upper-limit energy corresponding to the high frequency subband. The high frequency subband upper-limit energy may be calculated by using a formula (2).

$$E_u(k)=E_v(t)*b(k) \qquad \text{formula (2)}$$

where k is a $k^{th}$ high frequency subband, $E_u(k)$ is a positive integer, $E_u(k)$ is high frequency subband upper-limit energy corresponding to the $k^{th}$ high frequency subband. $E_u(k)$ is smoothed low frequency energy corresponding to a target low frequency signal, and b(k) is a preset energy upper-limit weight corresponding to the $k^{th}$ high frequency subband, for example, preset energy upper-limit weights of high frequency subbands may be (0.8, 0.7, 0.6, . . . ) sequentially.

Step 810. Calculate a ratio of the high frequency subband upper-limit energy to the high frequency subband energy, to obtain high frequency subband upper-limit gains.

The high frequency subband upper-limit gain is a corresponding upper-limit gain when a subband gain is performed on the high frequency subband, that is, the high frequency subband upper-limit gain cannot be exceeded when the subband gain is performed on the high frequency subband.

In some embodiments, the terminal calculates a ratio of each high frequency subband upper-limit energy to corresponding high frequency subband energy, to obtain a high frequency subband upper-limit gain. For example, the high frequency subband upper-limit gain may be calculated by using a formula (3).

$$M(k) = \frac{E_u(k)}{E(k)} \qquad \text{formula (3)}$$

where E(k) is high frequency subband energy corresponding to the $k^{th}$ high frequency subband. $E_u(k)$ is high frequency subband upper-limit energy corresponding to the $k^{th}$ high frequency subband. M(k) is a high frequency subband upper-limit gain corresponding to the $k^{th}$ high frequency subband.

Step 812. Calculate high frequency subband gains corresponding to the high frequency subbands, determine high frequency subband target gains based on the high frequency subband upper-limit gains and the high frequency subband gains, and perform howling suppression on the high frequency subbands based on the high frequency subband target gains, to obtain second target audio signals corresponding to the current time period.

The high frequency subband gain is calculated according to the high frequency subband gain coefficient and the past high frequency subband gain. The high frequency subband gain coefficient is determined according to the current howling detection result and the current voice detection result. The past high frequency subband gain is a high frequency subband gain corresponding to a past audio signal within the past time period. The high frequency subband target gain is a gain used when howling suppression is performed. The second target audio signal is an audio signal obtained after howling suppression is performed on all the high frequency subbands.

In some embodiments, the terminal obtains past high frequency subband gains corresponding to past high frequency subbands, determines high frequency subband gain coefficients according to the current howling detection result and the current voice detection result, and respectively calculates products of the past high frequency subband gains and the high frequency subband gain coefficients, to obtain high frequency subband gains corresponding to the high frequency subbands. The terminal respectively compares the high frequency subband upper-limit gains with the corresponding high frequency subband gains and selects relatively small gains in the high frequency subband upper-limit gains and the high frequency subband gains as high frequency subband target gains. For example, the high frequency subband target gain may be calculated by using a formula (4).

$$B(k)=\min[G(k),M(k)] \qquad \text{formula (4)}$$

where B(k) is a high frequency subband target gain corresponding to the $k^{th}$ high frequency subband, G(k) is a high frequency subband gain corresponding to the $k^{th}$ high frequency subband, and M(k) is a high frequency subband upper-limit gain corresponding to the $k^{th}$ high frequency subband. Then, the terminal performs howling suppression on the high frequency subbands by using the high frequency subband target gains, converts frequency domain audio signals corresponding to howling-suppressed high frequency subbands into time domain audio signals, to obtain second target audio signals corresponding to the current time period.

Figure 8A:
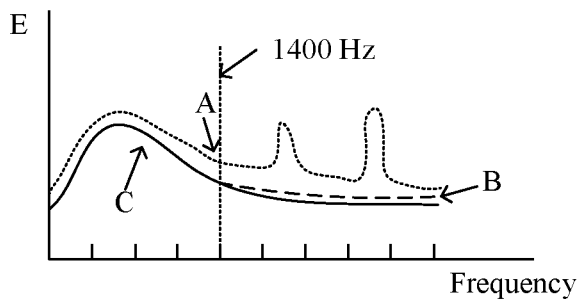
FIG. 8a is a schematic diagram of a curve of energy constraint according to an embodiment.

In one embodiment, FIG. 8a is a schematic diagram of an energy constraint curve. In the curve schematic diagram, a horizontal coordinate represents a frequency, and a longitudinal coordinate represents energy. Different subbands are obtained through division based on the frequency, and nine subbands are shown in the figure. Subbands of which frequencies are lower than 1400 Hz are low frequency bands, and subbands of which frequencies are higher than 1400 Hz are high frequency bands. The low frequency subbands are a first subband to a fourth subband, and the high frequency subbands are a fifth subband to a ninth subband. A curve C is an energy curve when an audio signal has only a voice signal. A curve B is an energy constraint curve for a high frequency signal. A curve A is an energy curve when the audio signal includes the voice signal and a howling signal. It can be obviously learned that when the low frequency bands, that is, the first subband to the fourth subband, have voice signals, energy constraint cannot be performed. When the high frequency bands, that is, after the fourth subband, include howling signals, energy of an audio signal needs to be constrained to below the curve B, to obtain a howling-suppressed audio signal.

In the foregoing embodiments, high frequency subband energy of a high frequency subband is constrained by using a high frequency subband upper-limit gain, to ensure the quality of the obtained second target audio signal.

Figure 9:
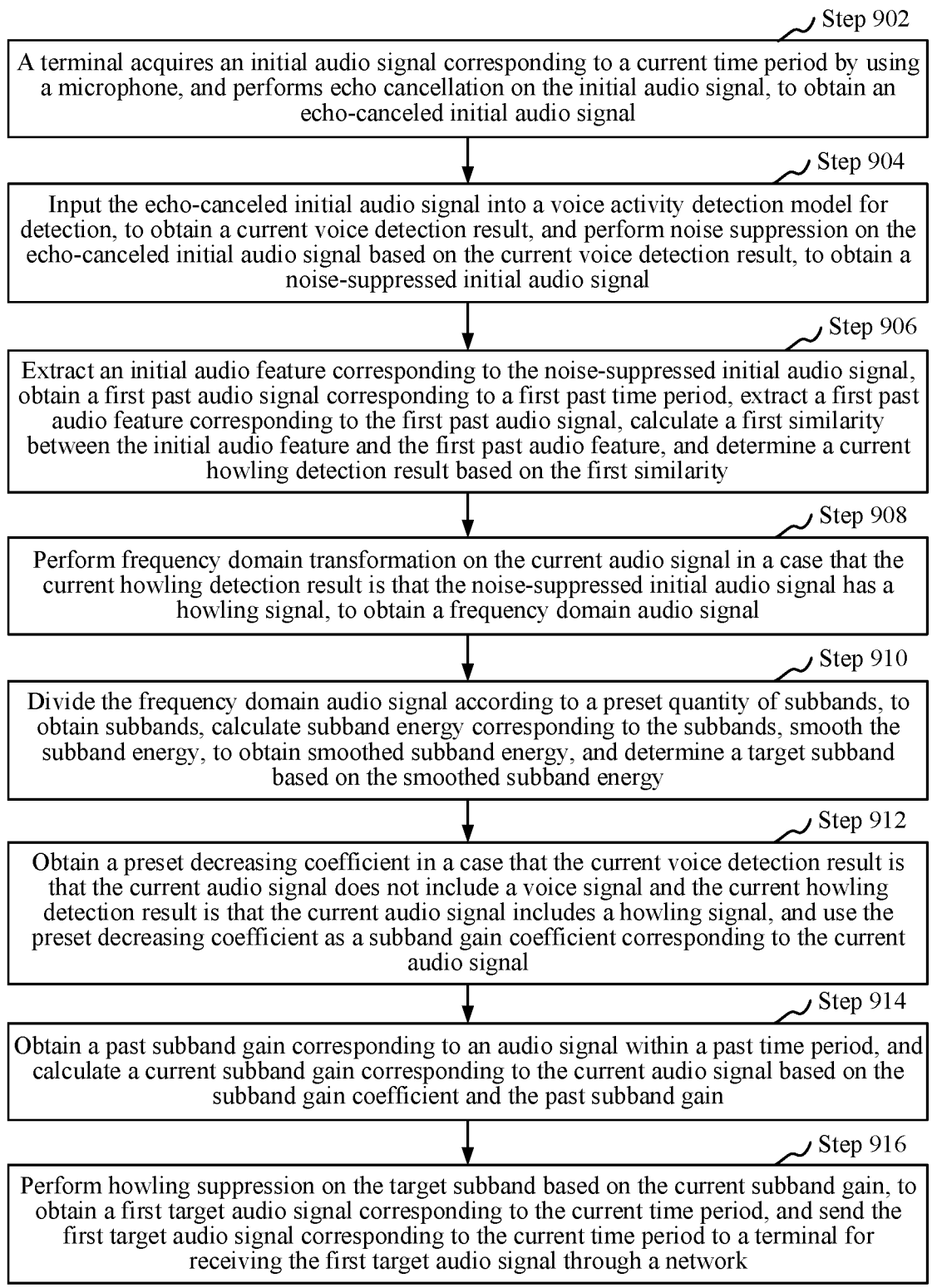
FIG. 9 is a schematic flowchart of a howling suppression method according to an embodiment.

In one embodiment, as shown in FIG. 9, the howling suppression method includes the following steps.

Step 902. Acquire an initial audio signal corresponding to a current time period by using a microphone, and perform echo cancellation on the initial audio signal, to obtain an echo-canceled initial audio signal.

Step 904. Input the echo-canceled initial audio signal into a voice activity detection model for detection, to obtain a current voice detection result. Noise suppression is performed on the echo-canceled initial audio signal based on the current voice detection result, to obtain a noise-suppressed initial audio signal.

Step 906. Extract an initial audio feature corresponding to the noise-suppressed initial audio signal, obtain a first past audio signal corresponding to a first past time period, extract a first past audio feature corresponding to the first past audio signal, calculate a first similarity measure between the initial audio feature and the first past audio feature, and determine a current howling detection result based on the first similarity measure.

Step 908. Perform frequency domain transformation on the current audio signal when the current howling detection result is that the noise-suppressed initial audio signal has a howling signal, to obtain a frequency domain audio signal.

Step 910. Divide the frequency domain audio signal according to a preset quantity of subbands, to obtain subbands, calculate subband energy corresponding to the subbands, smooth the subband energy, to obtain smoothed subband energy, and determine a target subband based on the smoothed subband energy.

Step 912. Obtain a preset decreasing coefficient when the current voice detection result is that the current audio signal does not include a voice signal and the current howling detection result is that the current audio signal includes a howling signal, and use the preset decreasing coefficient as a subband gain coefficient corresponding to the current audio signal.

Step 914. Obtain a past subband gain corresponding to an audio signal within a past time period, and calculate a current subband gain corresponding to the current audio signal based on the subband gain coefficient and the past subband gain.

Step 916. Perform howling suppression on the target subband based on the current subband gain, to obtain a first target audio signal corresponding to the current time period, and send the first target audio signal corresponding to the current time period to a terminal for receiving the first target audio signal through a network.

This application further provides an application scenario. The howling suppression method is applied to the application scenario. In some embodiments, application of the howling suppression method in the application scenario is as follows.

Figure 10:
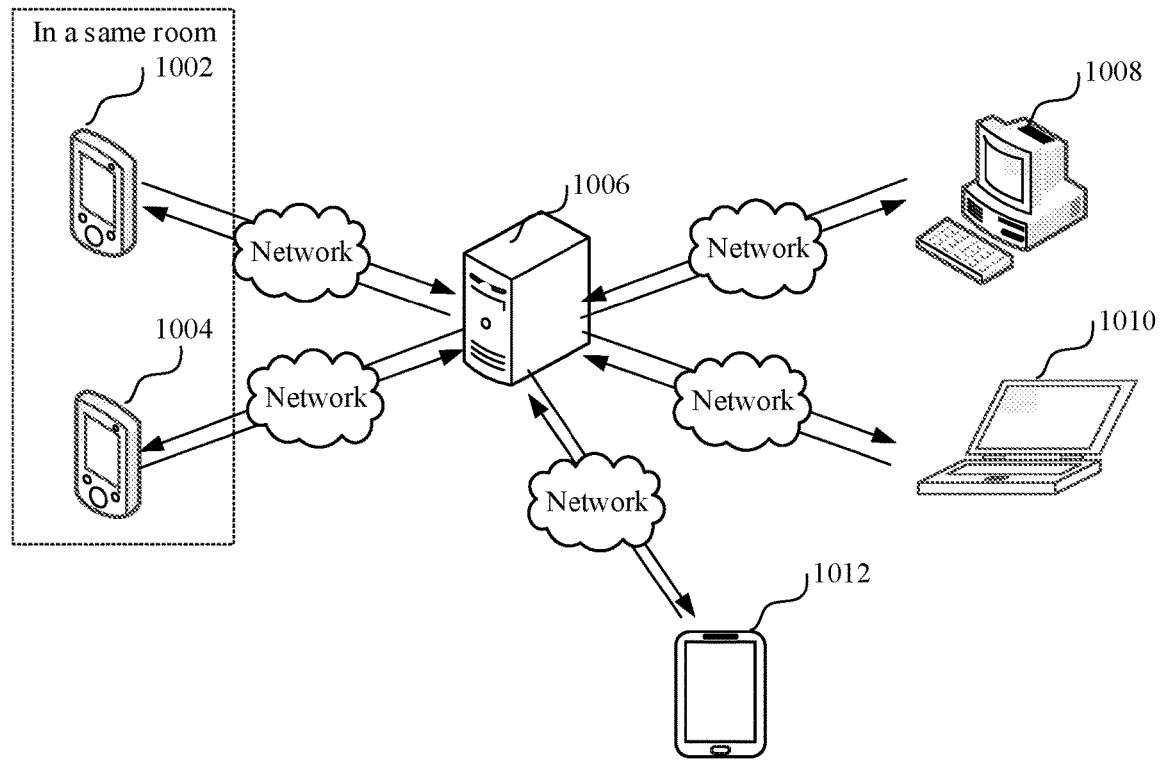
FIG. 10 is a schematic flowchart of a howling suppression method according to an embodiment.

FIG. 10 is a scenario application diagram of a howling suppression method. When a voice conference is performed by using a WeCom application, a terminal 1002 and a terminal 1004 are in a same room and perform a voice over Internet Protocol (VOIP) call with another terminal. In this case, after a voice acquired by using a microphone of the terminal 1002 is sent to the terminal 1004 through a network and is played by using a speaker of the terminal 1004, the microphone of the terminal 1002 acquires the voice again. Therefore, an acoustic loop is formed, and a "howling" acoustic effect is generated.

Figure 11:
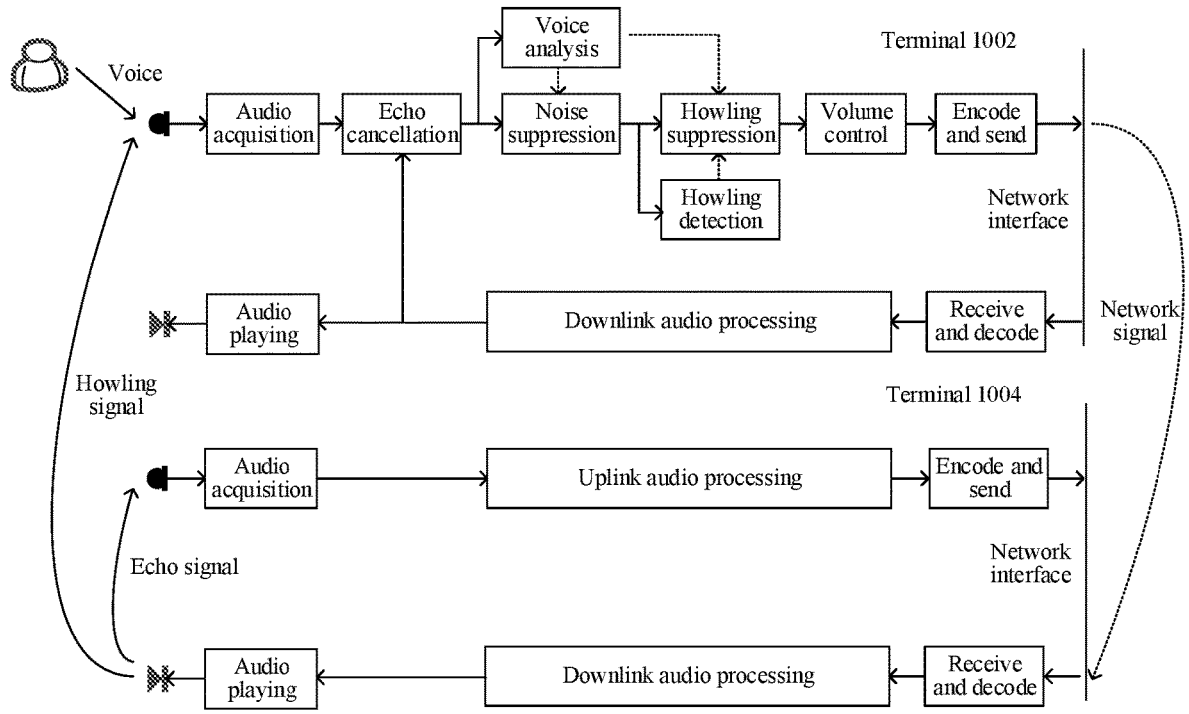
FIG. 11 is a schematic diagram of an application architecture of a howling suppression method according to an embodiment.

In this case, when howling suppression is performed, FIG. 11 is a schematic diagram of an architecture of a howling suppression method. All the terminals perform uplink audio processing on the audio signal acquired by using the microphone and encode and send the audio signal through a network. Audio playing is performed after downlink audio processing is performed on the audio signal obtained from a network interface.

In some embodiments, the terminal 1002 performs uplink audio processing on a voice acquired by using the microphone, and then encodes and sends the voice to a network side to form a network signal. The uplink audio processing includes performing echo cancellation on the audio signal, performing voice activity detection on an echo-canceled audio signal, that is, performing voice analysis recognition on a non-voice signal and a voice signal, performing noise suppression on the non-voice signal, to obtain a noise-suppressed initial audio signal, performing howling detection on the noise-suppressed initial audio signal, to obtain a howling detection result, and performing howling suppression according to the howling detection result and a voice activity detection result, to obtain a howling-suppressed voice signal, performing volume control on the howling-suppressed voice signal, and then encoding and sending the voice signal.

Figure 12:
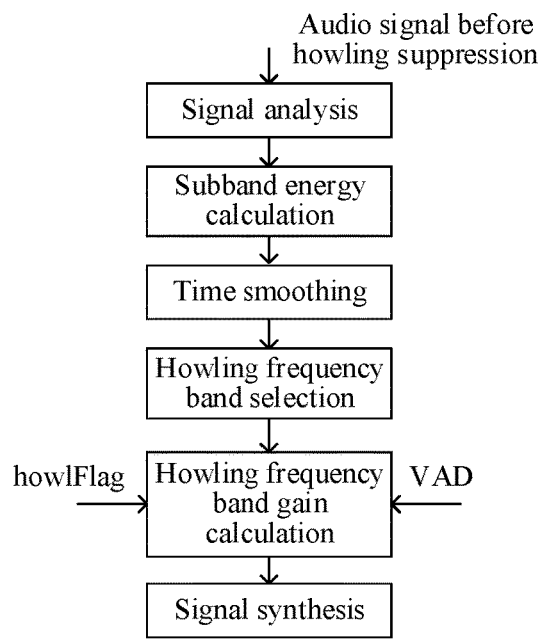
FIG. 12 is a schematic flowchart of a howling suppression method according to an embodiment.

When howling suppression is performed, FIG. 12 is a flowchart of performing howling suppression. The terminal 1002 performs signal analysis on an audio signal on which howling suppression needs to be performed, that is, transforms the audio signal from a time domain to a frequency domain, to obtain a frequency domain transformed audio signal, and calculates energy of subbands for the frequency domain transformed audio signal according to a preset quantity of subbands and a subband frequency range. Subsequently, the energy of the subbands is smoothed over time, to obtain smoothed subband energy. A subband with maximum smoothed subband energy selected from the smoothed subband energy is used as a target subband. A subband gain coefficient corresponding to the audio signal is determined based on a howling detection result and a voice detection result. Specifically, howlFlag represents the howling detection result. When howlFlag is 1, it indicates that the audio signal has a howling signal, and when howlFlag is 0, it indicates that the audio signal has no howling signal. When VAD is 1, it indicates that the audio signal includes a voice signal. When VAD is 0, it indicates that the audio signal does not include the voice signal. When howlFlag is 1 and VAD is 0, a preset decreasing coefficient is obtained as a subband gain coefficient, when howlFlag is 1 and VAD is 1, a preset first increasing coefficient is obtained as the subband gain coefficient, and when howlFlag is 0, a preset second increasing coefficient is obtained as the subband gain coefficient. In addition, a past subband gain used when howling processing is performed on a previous audio signal is obtained, a product of the past subband gain and the subband gain coefficient is calculated, to obtain a current subband gain, howling suppression is performed on the target subband by using the current subband gain, to obtain a howling-suppressed audio signal, and then the howling-suppressed audio signal is sent from a network side.

In addition, when howling suppression is performed, a target low frequency signal and a target high frequency signal may further be determined from the current audio signal based on a preset low frequency range. Low frequency energy corresponding to the target low frequency signal is calculated, and the low frequency energy is smoothed, to obtain smoothed low frequency energy. The target high frequency signal is divided, to obtain high frequency subbands, and high frequency subband energy corresponding to the high frequency subbands is calculated. Preset energy upper-limit weights corresponding to the high frequency subbands are obtained, and high frequency subband upper-limit energy corresponding to the high frequency subbands is calculated based on the preset energy upper-limit weights corresponding to the high frequency subbands and the smoothed low frequency energy. A ratio of the high frequency subband upper-limit energy to the high frequency subband energy is calculated, to obtain high frequency subband upper-limit gains. High frequency subband gains corresponding to the high frequency subbands are calculated, high frequency subband target gains are determined based on the high frequency subband upper-limit gains and the high frequency subband gains, howling suppression is performed on the high frequency subbands based on the high frequency subband target gains, to obtain second target audio signals corresponding to the current time period, and the second target audio signals are sent through a network side. When receiving a network signal through a network interface, the terminal 1004 decodes the network signal, to obtain an audio signal, and then performs audio playing after downlink audio processing. The downlink audio processing may be performing volume control and the like. Similarly, uplink audio processing performed by the terminal 1004 may also use a same method to process audio and then send the audio through a network side.

Figure 13:
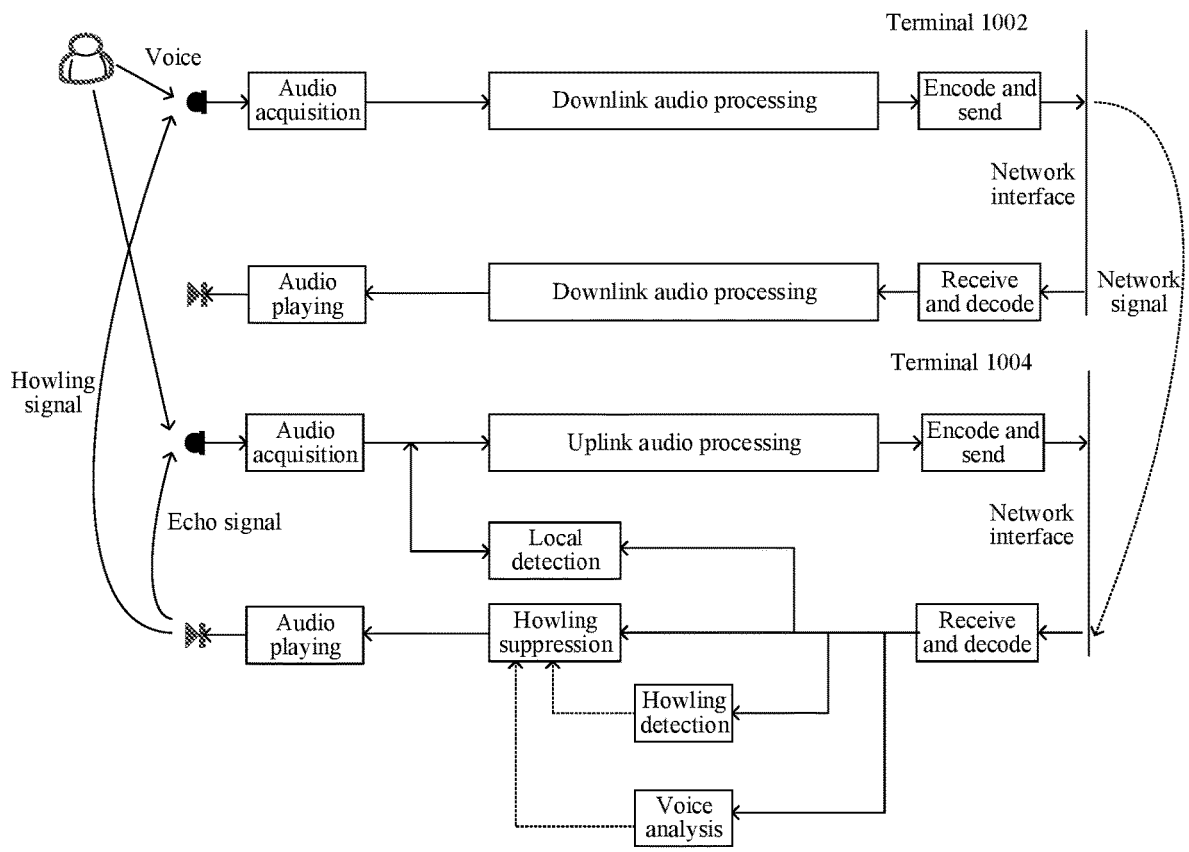
FIG. 13 is a schematic diagram of an application architecture of a howling suppression method according to another embodiment.

In an embodiment, FIG. 13 is another schematic diagram of an architecture of a howling suppression method. Specifically, As shown in FIG. 10, when the terminal 1002 sends the audio signal to terminals, because the terminal 1002 is relatively close to the terminal 1004, howling may be generated. However, another terminal, including a terminal 1008, a terminal 1010, and a terminal 1012 is relatively far away from the terminal 1002, howling is not generated. In this case, howling suppression may be performed in a terminal for receiving the audio signal. Specifically, when receiving the network signal sent by the terminal 1002 through a network interface, the terminal 1004 decodes the network signal, to obtain an audio signal, the audio signal being a signal after echo cancellation and noise suppression in a transmitting terminal. In this case, the terminal 1004 directly performs howling detection and voice activity detection on the audio signal, to obtain a howling detection result and a voice activity detection result. In addition, the terminal 1004 acquires a past audio signal with a same time length by using a microphone and performs local detection, the local detection being used for detecting whether the terminal 1004 is close to the terminal 1002. Specifically, an audio feature of the audio signal with the same time length acquired by using the microphone is extracted, an audio feature of the audio signal received through the network side is extracted, and then a similarity is calculated. When the similarity exceeds a preset similarity threshold for a period of time, it indicates that the terminal 1004 is close to the terminal 1002, and an obtained local detection result is that the terminal 1004 is close to the terminal 1002, it indicates that the terminal 1004 is a terminal that causes howling in an audio loop. In this case, howling suppression is performed according to the local detection result, the howling detection result, and the voice activity detection result, that is, howling is suppressed by performing the process shown in FIG. 12, to obtain a howling-suppressed audio signal, and then the terminal 1004 plays the howling-suppressed audio signal. In an embodiment, when the howling detection result is that a possibility that the audio signal has a howling signal exceeds a preset local detection suspension threshold, running of local detection is suspended, and howling suppression is performed according to only the howling detection result and the voice activity detection result, to save terminal resources.

Howling suppression is performed in the terminal for receiving the audio signal, to ensure quality of the audio signal received by another terminal for receiving audio. In addition, howling suppression is performed according to the local detection result, the howling detection result, and the voice activity detection result, to improve accuracy of howling suppression. Similarly, the downlink audio processing method of the terminal 1004, that is, a process of performing howling processing on audio information is also applicable to downlink audio processing in another terminal such as the terminal 1002.

Figure 14:
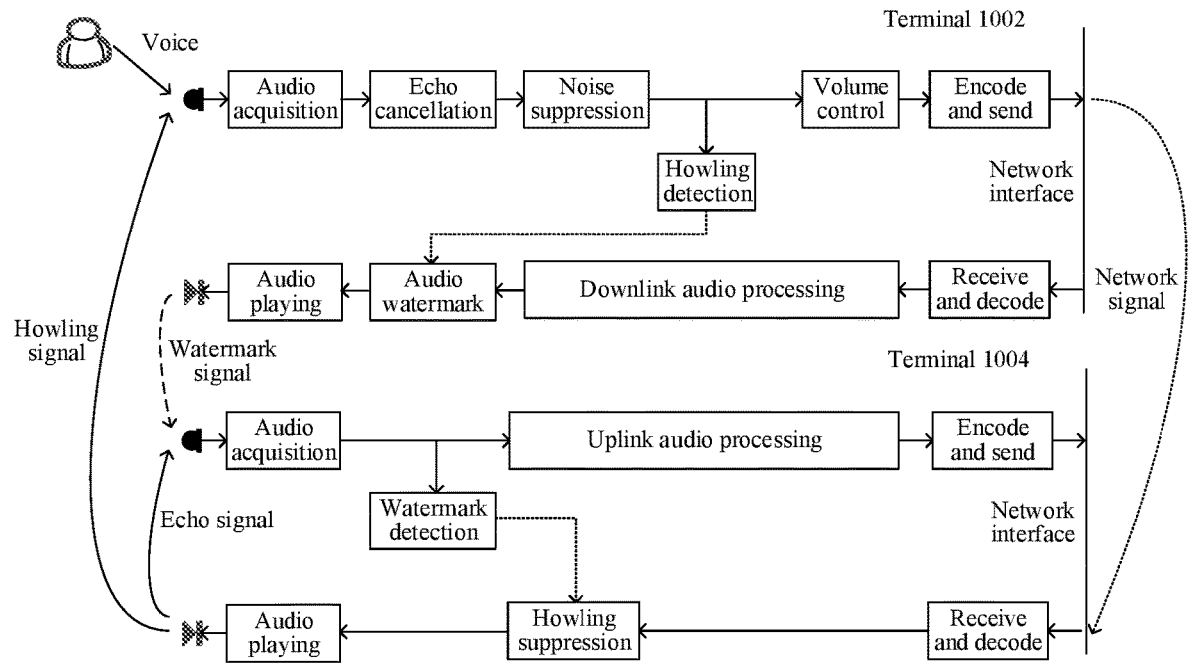
FIG. 14 is a schematic diagram of an application architecture of a howling suppression method according to still another embodiment.

In an embodiment, FIG. 14 is another schematic diagram of an architecture of a howling suppression method. Specifically, The terminal 1002 acquires a current audio signal by using a microphone, performs echo cancellation and noise suppression on the current audio signal, and then performs howling detection, to obtain a current howling detection result. When the current howling detection result is that the current audio signal has a howling signal, an audio signal to be played and a preset audio watermark signal are obtained, and the preset audio watermark signal is added to the audio signal to be played and the audio signal to be played is played by using a speaker. In addition, the current audio signal is encoded into a network signal after volume control, and the network signal is sent to the terminal 1004 through a network interface.

In this case, the terminal 1004 acquires, by using a microphone, the audio signal played by the terminal 1002 by using the speaker, performs watermark detection, that is, calculates an adjacent band energy ratio of the acquired audio signal, determines, when the adjacent band energy ratio exceeds a preset adjacent band energy ratio threshold, that the acquired audio signal includes a set audio watermark signal. In this case, the terminal 1004 obtains the network signal sent by the terminal 1002, decodes the network signal to obtain the audio signal, performs howling suppression on the audio signal, that is, performs the process shown in FIG. 12, to obtain a howling-suppressed audio signal, and plays the howling-suppressed audio signal by using a speaker. A transmitting terminal adds an audio watermark signal to an audio signal to be played, and because terminals that generate howling are relatively close, the receiving terminal acquires the audio signal to which the audio watermark signal is added by using a microphone, and performs watermark detection and howling suppression on the acquired audio signal, to improve accuracy of howling suppression. Similarly, the terminal 1004 may also add an audio watermark signal when sending an audio signal through a network side, and the terminal 1002 may also perform watermark detection to determine whether howling suppression is performed on the received audio signal.

It is to be understood that, although the steps in the flowcharts of FIG. 2, FIG. 3 to FIG. 8, and FIG. 9 are sequentially displayed according to indication of arrows, the steps are not necessarily sequentially performed in the sequence indicated by the arrows. Unless otherwise explicitly specified in this application, execution of the steps is not strictly limited, and the steps may be performed in other sequences. In addition, at least some steps in FIG. 2, FIG. 3, to FIG. 8, and FIG. 9 may include a plurality of steps or a plurality of stages. The steps or the stages are not necessarily performed at the same moment, and instead may be performed at different moments. The steps or the stages are not necessarily performed sequentially, and instead may be performed in turn or alternately with another step or at least some of steps or stages of another step.

Figure 15:
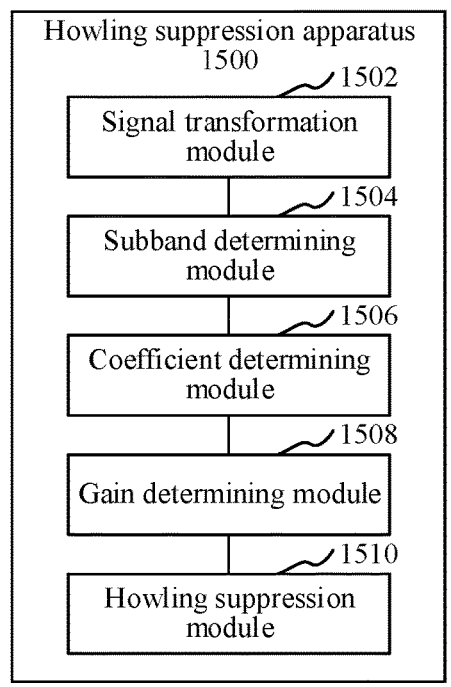
FIG. 15 is a structural block diagram of a howling suppression apparatus according to an embodiment.

In an embodiment, as shown in FIG. 15, a howling suppression apparatus 1500 is provided. The apparatus may be implemented as a part of a computer device by using a software module or a hardware module or a combination thereof. The apparatus includes: a signal transformation module 1502, a subband determining module 1504, a coefficient determining module 1506, a gain determining module 1508, and a howling suppression module 1510.

The signal transformation module 1502 is configured to obtain a current audio signal corresponding to a current time period, and perform frequency domain transformation on the current audio signal, to obtain a frequency domain audio signal.

The subband determining module 1504 is configured to divide the frequency domain audio signal, to obtain subbands, and determine a target subband from the subbands.

The coefficient determining module 1506 is configured to obtain a current howling detection result and a current voice detection result that correspond to the current audio signal, and determine a subband gain coefficient corresponding to the current audio signal based on the current howling detection result and the current voice detection result.

The gain determining module 1508 is configured to obtain a past subband gain corresponding to an audio signal within a past time period, and calculate a current subband gain corresponding to the current audio signal based on the subband gain coefficient and the past subband gain.

The howling suppression module 1510 is configured to perform howling suppression on the target subband based on the current subband gain, to obtain a first target audio signal corresponding to the current time period.

In an embodiment, the signal transformation module 1502 includes:
an echo cancellation unit, configured to acquire an initial audio signal corresponding to the current time period, and perform echo cancellation on the initial audio signal, to obtain an echo-canceled initial audio signal;
a voice detection unit, configured to perform voice activity detection on the echo-canceled initial audio signal, to obtain the current voice detection result;
a noise suppression unit, configured to perform noise suppression on the echo-canceled initial audio signal based on the current voice detection result, to obtain a noise-suppressed initial audio signal;
a howling detection unit, configured to perform howling detection on the noise-suppressed initial audio signal, to obtain the current howling detection result; and
a current audio signal determining unit, configured to use the noise-suppressed initial audio signal as the current audio signal corresponding to the current time period when the current howling detection result is that the noise-suppressed initial audio signal has a howling signal.

In an embodiment, the voice detection unit is further configured to input the echo-canceled initial audio signal into a voice activity detection model for detection, to obtain the current voice detection result, the voice activity detection model being trained by using a neural network algorithm based on a training audio signal and a corresponding training voice detection result.

In an embodiment, the voice detection unit is further configured to perform low-pass filtering on the echo-canceled initial audio signal, to obtain a low frequency signal; and calculate signal energy corresponding to the low frequency signal, calculate an energy fluctuation based on the signal energy, and determine the current voice detection result according to the energy fluctuation.

In an embodiment, the voice detection unit is further configured to perform low-pass filtering on the echo-canceled initial audio signal, to obtain a low frequency signal; and perform pitch detection on the low frequency signal, to obtain a pitch period, and determine the current voice detection result according to the pitch period.

In an embodiment, the howling detection unit is further configured to input the noise-suppressed initial audio signal into a howling detection model for detection, to obtain the current howling detection result, the howling detection model being trained by using a neural network algorithm based on a howling training audio signal and a corresponding training howling detection result.

In an embodiment, the howling detection unit is further configured to extract an initial audio feature corresponding to the noise-suppressed initial audio signal; obtain a first past audio signal corresponding to a first past time period, and extract a first past audio feature corresponding to the first past audio signal; and calculate a first similarity measure between the initial audio feature and the first past audio feature, and determine the current howling detection result based on the first similarity measure.

In an embodiment, the howling suppression apparatus further includes:
- a watermark adding module, configured to obtain an audio signal to be played and a preset audio watermark signal when the current howling detection result is that the current audio signal has a howling signal; and add the preset audio watermark signal to the audio signal to be played and play the audio signal to be played.

In an embodiment, the howling suppression apparatus further includes:
- a watermark detection module, configured to acquire a first audio signal corresponding to a first time period, perform audio watermark detection on the first audio signal, and determine that the first audio signal includes a target audio watermark signal;
- a signal obtaining module, configured to receive a target network encoded audio signal corresponding to a second time period, and decode the target network encoded audio signal, to obtain a target network audio signal; and
- a current audio signal determining module, configured to use the target network audio signal as the current audio signal based on a case that the first audio signal includes the target audio watermark signal.

In an embodiment, the signal transformation module 1502 includes:
- a network signal obtaining module, configured to receive a current network encoded audio signal corresponding to the current time period, and decode the network encoded audio signal, to obtain a current network audio signal;
- a network signal detection module, configured to perform voice activity detection on the current network audio signal, to obtain a network voice detection result, and perform howling detection on the current network audio signal, to obtain a network howling detection result;
- a feature extraction module, configured to extract a network audio feature of the current network audio signal, obtain a second past audio signal of a second past time period, and extract a second past audio feature corresponding to the second past time period; and
- a current audio signal obtaining module, configured to calculate a network audio similarity measure between the network audio feature and the second past audio feature, and determine the network audio signal as the current audio signal corresponding to the current time period based on the network audio similarity measure and the network howling detection result.

In an embodiment, the subband determining module 1504 is further configured to divide the frequency domain audio signal according to a preset quantity of subbands, to obtain the subbands; calculate subband energy corresponding to the subbands, and smooth the subband energy, to obtain smoothed subband energy; and determine the target subband based on the smoothed subband energy.

In an embodiment, the subband determining module 1504 is further configured to obtain the current howling detection result corresponding to the current audio signal, determine howling subbands from the subbands according to the current howling detection result, and obtain howling subband energy; and select target energy from the howling subband energy, and use a target howling subband corresponding to the target energy as the target subband.

In an embodiment, the coefficient determining module 1506 is further configured to obtain a preset decreasing coefficient when the current voice detection result is that the current audio signal does not include a voice signal and the current howling detection result is that the current audio signal includes a howling signal, and use the preset decreasing coefficient as the subband gain coefficient corresponding to the current audio signal; obtain a preset first increasing coefficient when the current voice detection result is that the current audio signal includes the voice signal and the current howling detection result is that the current audio signal includes the howling signal, and use the preset first increasing coefficient as the subband gain coefficient corresponding to the current audio signal; and obtain a preset second increasing coefficient when the current howling detection result is that the current audio signal does not include the howling signal, and use the preset second increasing coefficient as the subband gain coefficient corresponding to the current audio signal, the preset first increasing coefficient being greater than the preset second increasing coefficient.

In an embodiment, the howling suppression apparatus further includes:
- a signal division module, configured to determine a target low frequency signal and a target high frequency signal from the current audio signal based on a preset low frequency range;
- a low frequency energy calculation module, configured to calculate low frequency energy corresponding to the target low frequency signal, and smooth the low frequency energy, to obtain smoothed low frequency energy;
- a high frequency energy calculation module, configured to divide the target high frequency signal, to obtain high frequency subbands, and calculate high frequency subband energy corresponding to the high frequency subbands;
- an upper-limit energy calculation module, configured to obtain preset energy upper-limit weights corresponding to the high frequency subbands, and calculate high frequency subband upper-limit energy corresponding to the high frequency subbands based on the preset energy upper-limit weights corresponding to the high frequency subbands and the smoothed low frequency energy;
- an upper-limit gain determining module, configured to calculate a ratio of the high frequency subband upper-limit energy to the high frequency subband energy, to obtain high frequency subband upper-limit gains; and
- a target audio signal obtaining module, configured to calculate high frequency subband gains corresponding to the high frequency subbands, determine high frequency subband target gains based on the high frequency subband upper-limit gains and the high frequency subband gains, and perform howling suppression on the high frequency subbands based on the high frequency subband target gains, to obtain a second target audio signal corresponding to the current time period.

For a specific feature on the howling suppression apparatus, refer to the descriptions on the howling suppression method above. Details are not described herein again. The modules in the foregoing howling suppression apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and an internal structure diagram thereof may be shown in FIG. 16. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The communication interface of the computer device is configured to communicate with an external terminal in a wired or wireless manner. The wireless manner may be implemented through WIFI, an operator network, near field communication (NFC), or other technologies. The computer-readable instructions are executed by the processor to implement a howling suppression method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 16:
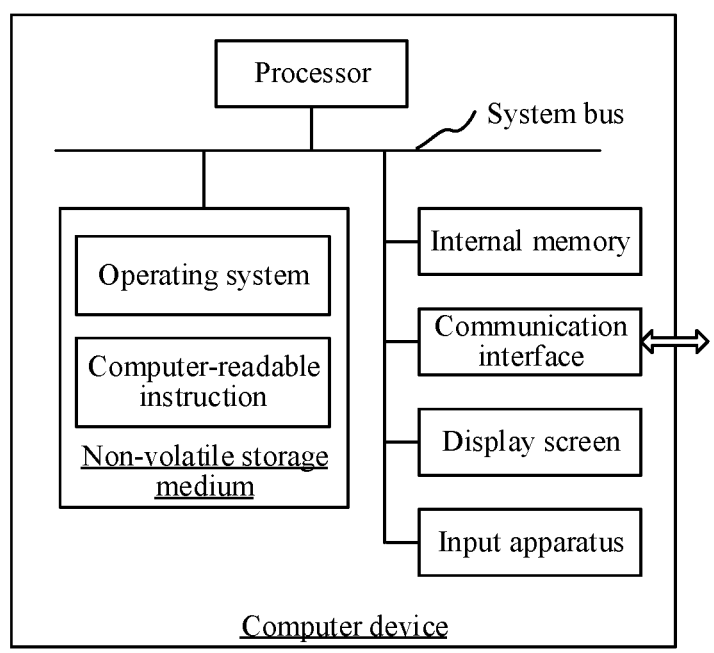
FIG. 16 is a diagram of an internal structure of a computer device according to an embodiment.

A person skilled in the art may understand that the structure shown in FIG. 16 is only a block diagram of a part of a structure related to a solution of this application and does not limit the computer device to which the solution of this application is applied. Specifically, the computer device may include more or fewer members than those in the drawings, or include a combination of some members, or include different member layouts.

In an embodiment, a computer device is provided, including a memory and a processor, the memory storing computer-readable instructions, the processor, when executing the computer-readable instructions, implementing the steps in the foregoing method embodiments.

In an embodiment, a non-volatile computer readable storage medium is provided, storing computer readable instructions. When being executed by one or more processors, the computer readable instructions cause the one or more processors to perform steps of the howling suppression method in any of the foregoing embodiments.

In an embodiment, a computer program product or a computer program is provided. The computer program product or the computer program comprises computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be comprised. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be combined in different ways to form additional embodiments. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application, which are described specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application is to be subject to the appended claims.

What is claimed is:

1. A howling suppression method, performed by a computer device, the method comprising:

obtaining a current audio signal corresponding to a current time period, and performing frequency domain transformation on the current audio signal, to obtain a frequency domain audio signal;

dividing the frequency domain audio signal, to obtain subbands, and determining a target subband from the subbands;

obtaining a current howling detection result and a current voice detection result that correspond to the current audio signal, and determining a subband gain coefficient corresponding to the current audio signal based on the current howling detection result and the current voice detection result, the determined subband gain coefficient comprising a preset decreasing coefficient, a preset first increasing coefficient, or a preset second increasing coefficient, wherein the determined subband gain coefficient comprises the preset decreasing coefficient when the current voice detection result indicates that the current audio signal does not comprise a voice signal and the current howling detection result indicates that the current audio signal comprises a howling signal, the determined subband gain coefficient comprises the preset first increasing coefficient when the current voice detection result indicates that the current audio signal comprises the voice signal and the current howling detection result indicates that the current audio signal comprises the howling signal, and the determined subband gain coefficient comprises the preset second increasing coefficient when the current howling detection result indicates that the current audio signal does not comprise the howling signal, the preset first increasing coefficient and the preset second increasing coefficient are each associated with a respective speed of restoration to an initial subband gain value, and the preset first increasing coefficient is associated with a greater speed of restoration to the initial subband gain value than the preset second increasing coefficient;

obtaining a past subband gain corresponding to an audio signal within a past time period, and calculating a current subband gain corresponding to the current audio signal based on the subband gain coefficient and the past subband gain; and suppressing howling on the target subband based on the current subband gain, to obtain a first target audio signal corresponding to the current time period, wherein the obtaining the current howling detection result comprises extracting an initial audio feature based on an initial audio signal corresponding to the current time period; extracting a first past audio feature based on a first past audio signal corresponding to a first past time period, the first past time period being before the current time period; calculating a first similarity measure between the initial audio feature and the first past audio feature; and determining the current howling detection result based on the first similarity measure.

2. The method according to claim 1, wherein the obtaining the current audio signal corresponding to the current time period comprises:
  acquiring the initial audio signal corresponding to the current time period, and performing echo cancellation on the initial audio signal, to obtain an echo-canceled initial audio signal;
  performing voice activity detection on the echo-canceled initial audio signal, to obtain the current voice detection result;
  performing noise suppression on the echo-canceled initial audio signal based on the current voice detection result, to obtain a noise-suppressed initial audio signal;
  performing howling detection on the noise-suppressed initial audio signal, to obtain the current howling detection result; and
  using the noise-suppressed initial audio signal as the current audio signal corresponding to the current time period when the current howling detection result indicates that the noise-suppressed initial audio signal includes a howling signal.

3. The method according to claim 2, wherein the performing voice activity detection on the echo-canceled initial audio signal, to obtain the current voice detection result comprises:
  performing low-pass filtering on the echo-canceled initial audio signal, to obtain a low frequency signal; and
  calculating signal energy corresponding to the low frequency signal, calculating an energy fluctuation based on the signal energy, and determining the current voice detection result according to the energy fluctuation.

4. The method according to claim 2, wherein the performing voice activity detection on the echo-canceled initial audio signal, to obtain the current voice detection result comprises:
  performing low-pass filtering on the echo-canceled initial audio signal, to obtain a low frequency signal; and
  performing pitch detection on the low frequency signal, to obtain a pitch period, and determining the current voice detection result according to the pitch period.

5. The method according to claim 2, wherein
  the initial audio feature is extracted according to the noise-suppressed initial audio signal; and
  the obtaining the current howling detection result further comprises obtaining the first past audio signal corresponding to the first past time period.

6. The method according to claim 1, further comprising:
  obtaining an audio signal to be played and an audio watermark signal when the current howling detection result is that the current audio signal has a howling signal; and
  adding the audio watermark signal to the audio signal to be played and playing the audio signal.

7. The method according to claim 6, further comprising:
  acquiring a first audio signal corresponding to a first time period, performing audio watermark detection on the first audio signal, and determining that the first audio signal comprises a target audio watermark signal;
  receiving a target network encoded audio signal corresponding to a second time period, and decoding the target network encoded audio signal, to obtain a target network audio signal; and
  using the target network audio signal as the current audio signal if the first audio signal comprises the target audio watermark signal.

8. The method according to claim 1, wherein the obtaining the current audio signal corresponding to the current time period comprises:
  receiving a current network encoded audio signal corresponding to the current time period, and decoding the current network encoded audio signal, to obtain a current network audio signal;
  performing voice activity detection on the current network audio signal, to obtain a network voice detection result, and performing howling detection on the current network audio signal, to obtain a network howling detection result;
  extracting a network audio feature of the current network audio signal, obtaining a second past audio signal of a second past time period, and extracting a second past audio feature corresponding to the second past audio signal; and
  calculating a network audio similarity measure between the network audio feature and the second past audio feature, and determining the current network audio signal as the current audio signal corresponding to the current time period based on the network audio similarity measure and the network howling detection result.

9. The method according to claim 1, wherein the dividing the frequency domain audio signal, to obtain the subbands, and determining the target subband from the subbands comprises:
  dividing the frequency domain audio signal according to a preset quantity of subbands, to obtain the subbands;
  calculating subband energy corresponding to the subbands, and smoothing the subband energy, to obtain smoothed subband energy; and
  determining the target subband based on the smoothed subband energy.

10. The method according to claim 9, wherein the determining the target subband based on the smoothed subband energy comprises:
  obtaining the current howling detection result corresponding to the current audio signal, determining howling subbands from the subbands according to the current howling detection result, and obtaining energy of the howling subbands; and
  selecting target energy from the energy of the howling subbands, and using a target howling subband corresponding to the target energy as the target subband.

11. The method according to claim 1, further comprising:
refraining from suppressing the howling in response to determining that the computer device is transmitting a first audio signal over a network.

12. The method according to claim 1, further comprising:
determining a target low frequency signal and a target high frequency signal from the current audio signal based on a preset low frequency range;
calculating low frequency energy corresponding to the target low frequency signal, and smoothing the low frequency energy, to obtain smoothed low frequency energy;
dividing the target high frequency signal, to obtain high frequency subbands, and calculating high frequency subband energy corresponding to the high frequency subbands;
obtaining preset energy upper-limit weights corresponding to the high frequency subbands, and calculating high frequency subband upper-limit energy corresponding to the high frequency subbands based on the preset energy upper-limit weights corresponding to the high frequency subbands and the smoothed low frequency energy;
calculating a ratio of the high frequency subband upper-limit energy to the high frequency subband energy, to obtain high frequency subband upper-limit gains; and
calculating high frequency subband gains corresponding to the high frequency subbands, determining high frequency subband target gains based on the high frequency subband upper-limit gains and the high frequency subband gains, and performing howling suppression on the high frequency subbands based on the high frequency subband target gains, to obtain second target audio signals corresponding to the current time period.

13. A computer device, comprising a memory and a processor, the memory storing computer-readable instructions, and the computer-readable instructions, when being executed by the processor, causing the processor to perform operations of a howling suppression method comprising:
obtaining a current audio signal corresponding to a current time period, and performing frequency domain transformation on the current audio signal, to obtain a frequency domain audio signal;
dividing the frequency domain audio signal, to obtain subbands, and determining a target subband from the subbands;
obtaining a current howling detection result and a current voice detection result that correspond to the current audio signal, and determining a subband gain coefficient corresponding to the current audio signal based on the current howling detection result and the current voice detection result, the determined subband gain coefficient comprising a preset decreasing coefficient, a preset first increasing coefficient, or a preset second increasing coefficient, wherein the determined subband gain coefficient comprises the preset decreasing coefficient when the current voice detection result indicates that the current audio signal does not comprise a voice signal and the current howling detection result indicates that the current audio signal comprises a howling signal, the determined subband gain coefficient comprises the preset first increasing coefficient when the current voice detection result indicates that the current audio signal comprises the voice signal and the current howling detection result indicates that the current audio signal comprises the howling signal, and the determined subband gain coefficient comprises the preset second increasing coefficient when the current howling detection result indicates that the current audio signal does not comprise the howling signal, the preset first increasing coefficient and the preset second increasing coefficient are each associated with a respective speed of restoration to an initial subband gain value, and the preset first increasing coefficient is associated with a greater speed of restoration to the initial subband gain value than the preset second increasing coefficient;
obtaining a past subband gain corresponding to an audio signal within a past time period, and calculating a current subband gain corresponding to the current audio signal based on the subband gain coefficient and the past subband gain; and
suppressing howling on the target subband based on the current subband gain, to obtain a first target audio signal corresponding to the current time period,
wherein the obtaining the current howling detection result comprises extracting an initial audio feature based on an initial audio signal corresponding to the current time period; extracting a first past audio feature based on a first past audio signal corresponding to a first past time period, the first past time period being before the current time period; calculating a first similarity measure between the initial audio feature and the first past audio feature; and determining the current howling detection result based on the first similarity measure.

14. The computer device according to claim 13, wherein the obtaining the current audio signal corresponding to the current time period comprises:
acquiring the initial audio signal corresponding to the current time period, and performing echo cancellation on the initial audio signal, to obtain an echo-canceled initial audio signal;
performing voice activity detection on the echo-canceled initial audio signal, to obtain the current voice detection result;
performing noise suppression on the echo-canceled initial audio signal based on the current voice detection result, to obtain a noise-suppressed initial audio signal;
performing howling detection on the noise-suppressed initial audio signal, to obtain the current howling detection result; and
using the noise-suppressed initial audio signal as the current audio signal corresponding to the current time period when the current howling detection result indicates that the noise-suppressed initial audio signal includes a howling signal.

15. The computer device according to claim 14, wherein the performing voice activity detection on the echo-canceled initial audio signal, to obtain the current voice detection result comprises:
performing low-pass filtering on the echo-canceled initial audio signal, to obtain a low frequency signal; and
calculating signal energy corresponding to the low frequency signal, calculating an energy fluctuation based on the signal energy, and determining the current voice detection result according to the energy fluctuation.

16. The computer device according to claim 14, wherein the performing voice activity detection on the echo-canceled initial audio signal, to obtain the current voice detection result comprises:
performing low-pass filtering on the echo-canceled initial audio signal, to obtain a low frequency signal; and performing pitch detection on the low frequency signal, to obtain a pitch period, and determining the current voice detection result according to the pitch period.

17. The computer device according to claim 14, wherein
the initial audio feature is extracted according to the noise-suppressed initial audio signal; and
the obtaining the current howling detection result further comprises obtaining the first past audio signal corresponding to the first past time period.

18. One or more non-transitory computer readable storage media storing computer-readable instructions, the computer-readable instructions, when being executed by one or more processors, causing the processors to perform operations of a howling suppression method comprising:
obtaining a current audio signal corresponding to a current time period, and performing frequency domain transformation on the current audio signal, to obtain a frequency domain audio signal;
dividing the frequency domain audio signal, to obtain subbands, and determining a target subband from the subbands;
obtaining a current howling detection result and a current voice detection result that correspond to the current audio signal, and determining a subband gain coefficient corresponding to the current audio signal based on the current howling detection result and the current voice detection result, the determined subband gain coefficient comprising a preset decreasing coefficient, a preset first increasing coefficient, or a preset second increasing coefficient, wherein the determined subband gain coefficient comprises the preset decreasing coefficient when the current voice detection result indicates that the current audio signal does not comprise a voice signal and the current howling detection result indicates that the current audio signal comprises a howling signal, the determined subband gain coefficient comprises the preset first increasing coefficient when the current voice detection result indicates that the current audio signal comprises the voice signal and the current howling detection result indicates that the current audio signal comprises the howling signal, and the determined subband gain coefficient comprises the preset second increasing coefficient when the current howling detection result indicates that the current audio signal does not comprise the howling signal, the preset first increasing coefficient and the preset second increasing coefficient are each associated with a respective speed of restoration to an initial subband gain value, and the preset first increasing coefficient is associated with a greater speed of restoration to the initial subband gain value than the preset second increasing coefficient;
obtaining a past subband gain corresponding to an audio signal within a past time period, and calculating a current subband gain corresponding to the current audio signal based on the subband gain coefficient and the past subband gain; and
suppressing howling on the target subband based on the current subband gain, to obtain a first target audio signal corresponding to the current time period,
wherein the obtaining the current howling detection result comprises extracting an initial audio feature based on an initial audio signal corresponding to the current time period; extracting a first past audio feature based on a first past audio signal corresponding to a first past time period, the first past time period being before the current time period; calculating a first similarity measure between the initial audio feature and the first past audio feature; and determining the current howling detection result based on the first similarity measure.

19. The computer readable storage media according to claim 18, further comprising:
obtaining an audio signal to be played and an audio watermark signal when the current howling detection result is that the current audio signal has a howling signal; and
adding the audio watermark signal to the audio signal to be played and playing the audio signal.

* * * * *